US008001767B2

(12) United States Patent
Kakuya et al.

(10) Patent No.: US 8,001,767 B2
(45) Date of Patent: Aug. 23, 2011

(54) ENGINE CONTROLLER

(75) Inventors: Hiromu Kakuya, Hitachi (JP); Shinji Nakagawa, Hitachinaka (JP); Shiro Yamaoka, Hitachi (JP); Atsushi Shimada, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1370 days.

(21) Appl. No.: 10/588,737

(22) PCT Filed: Feb. 9, 2004

(86) PCT No.: PCT/JP2004/001334
§ 371 (c)(1),
(2), (4) Date: Aug. 8, 2006

(87) PCT Pub. No.: WO2005/075803
PCT Pub. Date: Aug. 18, 2005

(65) Prior Publication Data
US 2007/0157604 A1    Jul. 12, 2007

(51) Int. Cl.
*F01N 3/00*    (2006.01)
(52) U.S. Cl. .................. 60/285; 60/276; 60/301
(58) Field of Classification Search ............ 60/276, 60/278, 285, 295, 301
See application file for complete search history.

(56) References Cited

U.S. PATENT DOCUMENTS

| 6,609,364 | B2* | 8/2003 | Litorell et al. ............ 60/274 |
|---|---|---|---|
| 6,772,585 | B2 | 8/2004 | Iihoshi et al. | |
| 2003/0226528 | A1 | 12/2003 | Yamaoka et al. | |

FOREIGN PATENT DOCUMENTS

| JP | 7-189799 | A | 7/1995 |
|---|---|---|---|
| JP | 9-158767 | A | 6/1997 |
| JP | 2001-241320 | A | 9/2001 |
| JP | 2002-97978 | A | 4/2002 |
| JP | 2002-339778 | A | 11/2002 |
| JP | 2003-106184 | A | 4/2003 |
| JP | 2003-278589 | A | 10/2003 |
| JP | 2004-19638 | A | 1/2004 |
| WO | WO 02/14665 | A1 | 2/2002 |

OTHER PUBLICATIONS

Japanese Office Action dated Oct. 21, 2008 (Three (3) pages).
International Search Report dated Apr. 13, 2004 (one (1) page).
Japanese Office Action dated Jun. 24, 2008 (Three (3) pages).
Japanese Office Action dated Mar. 8, 2011 (four (4) pages).

* cited by examiner

Primary Examiner — Thomas E Denion
Assistant Examiner — Diem Tran
(74) Attorney, Agent, or Firm — Crowell & Moring LLP

(57) ABSTRACT

A first, a second, and a third combustion region are defined by the air-fuel ratio of the mixture gas feeding combustion. Upon switching of combustion regions from the first combustion region to the third combustion region and from the third combustion region to the first combustion region, namely, when the second combustion region is passed, the mass of NOx emission downstream of an exhaust purifying device and the torque variation are estimated online. Based on the estimated value of the mass of NOx emission and the estimated value of the torque variation, the mass of intake air introduced into the combustion chamber is adjusted in a manner different from when normal, such as by changing the amount of lift of the intake valve, for example, so as to reduce the mass of NOx emission downstream of the exhaust purifying device and the torque variation below predetermined values upon passing of the second combustion region. Thus, the increase in exhaust emissions and the deterioration of operability during the switching of combustion regions can be suppressed.

23 Claims, 19 Drawing Sheets

FIG. 13
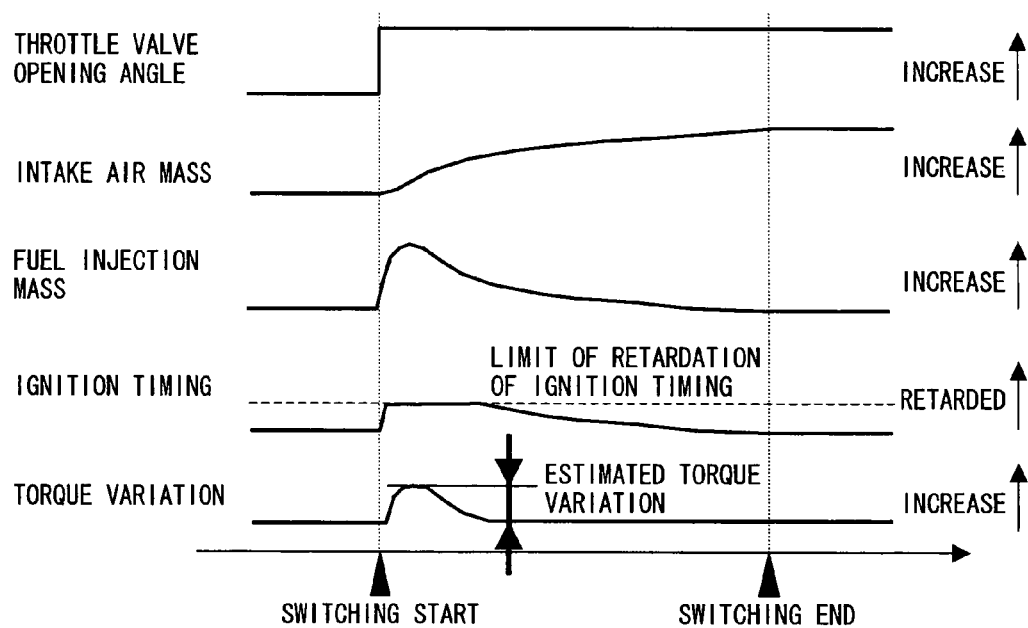
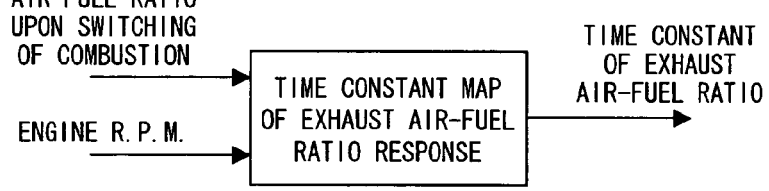
FIG. 14

ENGINE CONTROLLER

TECHNICAL FIELD

The present invention relates to an engine controller and particularly to an engine controller that is operated in a first, a second, and a third combustion region defined by the air-fuel ratio, wherein the deterioration in exhaust emission and operability during the switching of combustion regions from the first combustion region to the third combustion region and from the third combustion region to the first combustion region can be effectively suppressed.

BACKGROUND ART

In the field of automotive and other engines, a lean-burn engine has been put to practical use (see FIG. 1) in which, with a view to achieving better mileage, combustion at a lean air-fuel ratio, in which the percentage of air is greater than that according to the theoretical air-fuel ratio (to be hereafter referred to as a stoichiometry), and stoichiometric combustion are switched. In one example ("port injection"), fuel injection takes place near the intake port at the downstream end of the intake passage so as to achieve lean burn with an air-fuel ratio ranging from 20 to 25. In another example ("direct injection"), fuel is injected directly into the cylinder (combustion chamber) so as to produce a layered air-fuel mixture and carry out combustion in an extremely lean region with an air-fuel ratio ranging from 40:1 to 50:1. In these examples, pumping loss and thermal loss are reduced and better mileage is achieved by lean combustion; namely, by increasing the mass of air introduced into the cylinder (combustion chamber).

When stoichiometric combustion takes place, HC, CO, and NOx in the exhaust gas can be simultaneously subjected to oxidation-reduction and thus purified by a three-way catalyst installed in the exhaust passage. However, during combustion at a lean air-fuel ratio, the exhaust gas contains excess oxygen and it becomes difficult to perform NOx reduction. To counter this problem, an engine exhaust purifying apparatus has been proposed (see JP Patent Publication (Kokai) No. 2001-241320 A, for example) wherein a lean NOx catalyst is installed downstream of the exhaust passage. The catalyst stores NOx in the exhaust gas when the air-fuel ratio in the exhaust gas is lean (excess air) and discharges it when the air-fuel ratio is rich (excess fuel), thereby performing reduction, catalytic reduction, or the like. The air-fuel ratio of the air-fuel mixture is temporarily changed from lean to stoichiometric or rich at predetermined periods so as to allow the NOx stored in the lean NOx catalyst to be discharged or reduced, so that the NOx storage capacity can be restored.

The above lean NOx catalyst is adjusted depending on the air-fuel ratio in the exhaust gas. It has a high NOx storage capacity when the air-fuel ratio of the air-fuel mixture in the combustion chamber or the air-fuel ratio at the entrance to the lean NOx catalyst is approximately 17 or higher. However, its NOx purifying capacity decreases at air-fuel ratios of stoichiometry or approximately 17 and lower, so that most of the NOx in the exhaust gas is not stored and it is allowed to pass (see FIG. 2).

In order to solve this problem, a method has been proposed whereby, upon switching between combustion at a lean air-fuel ratio and combustion at a stoichiometric or rich air-fuel ratio, the duration of time in which the air-fuel ratio remains in a region where the purification or storage of NOx is not allowed is minimized.

A combustion region switching technique for reducing NOx emission is also proposed. According to this technique, when the air-fuel ratio is switched from lean to stoichiometric or rich, for example, the opening angle of the throttle valve for adjusting the mass of air introduced into the combustion chamber is reduced so as to decrease the air mass while the mass of fuel supplied (fuel injection mass) is temporarily increased and the air-fuel ratio is varied in a skipped manner so as to compensate for the transmission delay of air mass in response to the change in the opening angle of the throttle valve. The variation in engine torque caused by the increase in the fuel injection mass is compensated by retarding (delaying) the ignition timing so as to suppress the increase in exhaust emissions and the deterioration of operability. An example of an engine control apparatus that carries out such control is disclosed in JP Patent Publication (Kokai) No. 7-189799 A (1995).

Lean-burn engines aim to improve gas mileage by lean combustion. As mentioned above, in order to reduce NOx emission during lean operation, it is necessary to install a lean NOx catalyst in the exhaust passage. However, the improvement in gas mileage gained by such installation is cancelled out by the cost increase associated with the installment of the lean NOx catalyst. Thus, systems are being considered that are not equipped with lean NOx catalysts for cost reduction purposes.

FIG. 3 shows the mass of NOx emission in a lean-burn engine. As shown, when a lean NOx catalyst is installed, high NOx purification rates are obtained in regions of air-fuel ratio from stoichiometry to rich and from approximately 17 to lean, indicating the decrease in NOx emission. On the other hand, when no lean NOx catalyst is installed, NOx emissions increase in a region of air-fuel ratio from approximately 17 to lean. Thus, the air-fuel ratio region in which large amounts of NOx are emitted from the exhaust passage exit extends from stoichiometry to air-fuel ratio A, which is larger than when the lean NOx catalyst is installed. Thus, in order to reduce the NOx emission of a lean-burn engine not equipped with a lean NOx catalyst, combustion region switching technology is required whereby combustion at a stoichiometric or rich air-fuel ratio and combustion at a leaner air-fuel ratio than air-fuel ratio A can be switched while quickly passing the extended air-fuel ratio region (stoichiometry to air-fuel ratio A), in which NOx emissions increase.

When conventional technology is used for reducing NOx emission upon switching of combustion regions, the air-fuel ratio can be switched by manipulating (increasing or decreasing) the air mass and the fuel injection mass, whereby NOx emission can be reduced. However, since the air-fuel ratio needs to be changed greatly upon switching, the fuel injection mass also needs to be manipulated greatly in order to execute the switching of the air-fuel ratio. As a result, the torque variation due to the manipulation of the fuel injection mass upon switching of combustion regions increases. While the ignition timing is retarded in order to reduce such torque variation, as mentioned above, the amount of manipulation of the fuel injection mass is so large that the torque variation cannot be fully suppressed by the implementation of ignition timing retardation.

Compression ignition engines have also been proposed in which attempts are made to improve gas mileage by lean combustion, as in lean-burn engines. Compressed ignition engines are capable of operating at an ultra-lean air-fuel ratio region (air-fuel ratio of 80 or higher), which is not achievable with the conventional gasoline engines. Because flame temperature can be lowered and ignition and combustion with uniform air-fuel mixture is realized, significant decrease in NOx emission can be achieved in a compression ignition engine (see JP Patent Publication (Kokai) No. 2003-106184 A, for example).

The aforementioned compression ignition engine, however, requires highly precise ignition control. Thus, it is difficult to use the engine in high-load, high-speed conditions, and the engine is characterized in that compression ignition is conducted only in low-load, low-speed regions (see FIG. 4).

The inventors also found that, while NOx emission can be reduced during lean combustion in the compression ignition engine, the NOx emission are dependent on the air-fuel ratio. Specifically, although NOx emission are only dozens of ppm or less when the air-fuel ratio is in a region from approximately 20 to lean, hundreds of ppm of NOx are emitted in a region of air-fuel ratio from stoichiometry to approximately 20 or less (see FIG. 5). Thus, as in the lean-burn engine, combustion region switching technology is required that allows the switching between combustion at stoichiometric to rich air-fuel ratio and combustion at lean air-fuel ratio of 20 or higher in order to reduce NOx emission.

When conventional technology is applied to the aforementioned compression ignition engine, NOx emission can be reduced upon switching of the combustion regions by manipulating the air mass and fuel injection mass. However, as in a lean-burn engine not equipped with a lean NOx catalyst, the air-fuel ratio varies greatly upon switching of combustion, and so the torque variation due to fuel injection mass manipulations cannot be fully reduced by the retarding of the ignition timing.

Specifically, as explained with reference to the examples of lean-burn engines not equipped with lean NOx catalysts and of compression ignition engines, the aforementioned conventional technique does not take into consideration the cases where the amount of variation of the air-fuel ratio necessary upon switching of combustion regions becomes large. Thus, while the conventional technique can suppress the increase in exhaust emissions upon switching of combustion regions, it cannot fully suppress torque variation.

It is therefore an object of the invention to provide an engine controller capable of effectively suppressing the increase of exhaust emissions due to the increase in NOx emission and the deterioration of operability due to the development of torque variation upon switching between combustion at a stoichiometric or rich air-fuel ratio and combustion at a lean air-fuel ratio.

DISCLOSURE OF THE INVENTION

In order to achieve the above object, the invention provides an engine controller comprising an exhaust purifying device capable of purifying NOx at an air-fuel ratio richer than stoichiometry, wherein a first combustion region, a second combustion region, and a third combustion region are defined as combustion regions having air-fuel ratios of the mixture gas feeding combustion that sequentially vary from rich to lean, wherein combustion regions are switched from the first combustion region to the third combustion region via the second combustion region, or from the third combustion region to the first combustion region via the second combustion region. The engine controller further comprises:

a combustion control means for controlling the mass of intake air introduced into the combustion chamber upon switching of combustion regions in a manner different from when normal, so as to reduce the mass of NOx emission downstream of the exhaust purifying device and the torque variation as much as possible when the second combustion region is passed.

In a preferred embodiment, the engine controller further comprises:

means for estimating the mass of NOx emission downstream of the exhaust purifying device online upon passing of the second combustion region;

means for estimating the torque variation online upon passing of the second combustion region; and combustion control means for reducing the mass of NOx emission downstream of the exhaust purifying device and the torque variation mass below predetermined values based on the estimated value of the mass of NOx emission and the estimated value of the torque variation when the second combustion region is passed.

Preferably, the means for estimating the mass of NOx emission comprises:

means for estimating the mass of NOx emission at the entrance to the exhaust purifying device based on the air-fuel ratio of the mixture gas feeding combustion, engine r.p.m., engine torque, and the mass of EGR introduced into the combustion chamber or the mass of EGR remaining in the combustion chamber when the second combustion region is passed; and a catalyst model for estimating the mass of NOx emission at the exit of the exhaust purifying device based on the air-fuel ratio at the entrance to the exhaust purifying device, the temperature of the exhaust purifying device, and the estimated mass of NOx emission at the entrance to the exhaust purifying device.

Preferably, the means for estimating the mass of NOx emission estimates the mass of NOx emission downstream of the exhaust purifying device upon switching of combustion regions by accumulating the concentration of NOx calculated at intervals of T2 for a period T1, where T2 is sufficiently shorter than T1.

In another preferred embodiment, the controller further comprises an air-fuel ratio sensor for detecting the concentration of NOx in the exhaust gas upstream or downstream of the exhaust purifying device, wherein the means for estimating the mass of NOx emission adjusts parameters for the estimation of the mass of NOx emission based on the output of the air-fuel ratio sensor.

Preferably, the means for estimating the torque variation estimates the torque variation amount based on the mass of fuel supply and the engine r.p.m. at the time of the passing of the second combustion region.

Preferably, the means for estimating the of torque variation causes the intake air mass to be changed by changing the opening angle of the throttle valve within a predetermined time upon switching of combustion regions, and then estimates torque variation based on the torque variation due to a correction of the mass of fuel supply that is made so as to compensate the time delay in the change of the intake air mass in response to the change in the throttle valve.

In another preferred embodiment, the means for estimating torque variation causes the ignition timing to be retarded upon switching of combustion regions and then estimates torque variation based on a value obtained by subtracting the torque variation due to the retarding of the ignition timing from the torque variation due to the correction of the mass of fuel supply.

In another preferred embodiment, the controller further comprises a torque sensor for detecting the engine torque, wherein the means for estimating torque variation adjusts parameters for the estimation of torque variation based on the output of the torque sensor.

In another preferred embodiment, the controller further comprises means capable of varying the intake air mass in a shorter time than the time delay of the change in the intake air mass in response to the change in the opening angle of the throttle valve, wherein the combustion control means causes the intake air mass to be changed using the means for varying the mass of air if the torque variation due to the correction of the fuel supply mass exceeds a predetermined value.

Preferably, the means for varying the mass of air comprises an intake valve of which at least one of the open/close time, the open/close timing, and the amount of lift is variable.

Preferably, the combustion control means corrects the fuel supply mass such that the air-fuel ratio of the mixture gas feeding combustion is changed within a predetermined time if the response delay in the air-fuel ratio of the mixture gas feeding combustion in response to a change in a target air-fuel ratio during the passing of the second combustion region exceeds a predetermined value.

In another preferred embodiment, if a torque variation is caused by the correction of fuel supply mass during the passing of the second combustion region, the combustion control means suppresses the torque variation by retarding the ignition timing.

In another preferred embodiment, the controller comprises:

an exhaust system model for estimating the air-fuel ratio at the entrance to the exhaust purifying device based on the air-fuel ratio of the mixture gas, engine r.p.m., and engine torque during the passing of the second combustion region; and an exhaust system inverse model for estimating the air-fuel ratio of the mixture gas based on the air-fuel ratio at the entrance to the exhaust purifying device that is estimated by the exhaust system model, wherein the combustion control means changes the air-fuel ratio of the mixture gas based on the exhaust system inverse model if the time it takes to pass the second combustion region exceeds a predetermined value.

Preferably, parameters of the exhaust system inverse model are adjusted based on the output of the air-fuel ratio sensor.

Preferably, the combustion control means, upon switching of combustion regions, adjusts the opening angle of the throttle valve so as to change the response characteristics of the air mass between the throttle valve and the means for varying the mass of air, and it simultaneously adjusts the operation of the means for varying the mass of air so as to make the intake air mass equal to that prior to the adjustment of the throttle valve opening angle, the combustion control means thereafter controlling the operation of the means for varying the mass of air so as to change the intake air mass.

In preferred embodiments, the first combustion region is defined as an air-fuel ratio region from stoichiometry to rich, the exhaust purifying device comprises a lean NOx catalyst, the second combustion region is defined as an air-fuel ratio region between stoichiometry and an air-fuel ratio at which the NOx storage efficiency of the lean NOx catalyst exceeds a predetermined value, and the third combustion region is defined as a region in which the air-fuel ratio is leaner than the air-fuel ratio at which the NOx storage efficiency of the lean NOx catalyst exceeds a predetermined value.

In another preferred embodiment, the engine comprises a compression ignition engine and the exhaust purifying device comprises a three-way catalyst.

In this case, the second combustion region is defined as an air-fuel ratio region between stoichiometry and an air-fuel ratio at which the NOx concentration at the exit of the combustion chamber drops below a predetermined value, and the third combustion region is defined as a region in which the air-fuel ratio is leaner than the air-fuel ratio at which the NOx concentration at the exit of the combustion chamber is below a predetermined value.

Thus, in accordance with the engine controller of the invention, a first, a second, and a third combustion region are defined by the air-fuel ratio of the mixture gas feeding combustion. Upon switching of combustion regions from the first combustion region to the third combustion region and from the third combustion region to the first combustion region, namely, when the second combustion region is passed, the mass of NOx emission downstream of an exhaust purifying device and the torque variation are estimated online. Based on the estimated value of the mass of NOx emission and the estimated value of the torque variation, the mass of intake air introduced into the combustion chamber is adjusted in a manner different from when normal, such as by changing the amount of lift of the intake valve, for example, so as to reduce the mass of NOx emission downstream of the exhaust purifying device and the torque variation below predetermined values upon passing of the second combustion region. Thus, the increase in exhaust emissions and the deterioration of operability during the switching of combustion regions can be both effectively suppressed.

BRIEF DESCRIPTION OF THE DRAWINGS

FIG. 13 shows a time chart illustrating the relationship between the manipulation of the intake air mass, fuel injection mass, and ignition timing and the torque variation upon switching of combustion regions.

FIG. 14 shows a functional block diagram illustrating the details of a means for estimating the exhaust transfer characteristics shown in FIG. 11.

BEST MODE FOR CARRYING OUT THE INVENTION

Hereafter, several embodiments of the invention are described with reference to the drawings.

First Embodiment

Figure 6:
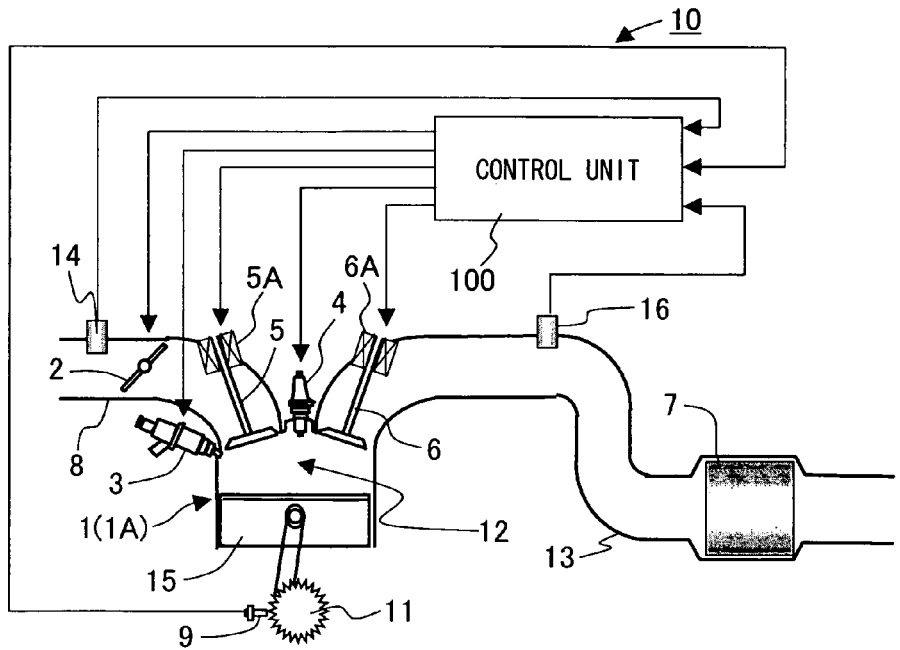
FIG. 6 schematically shows a first embodiment of a controller according to the invention, together with an engine to which the controller is applied.

FIG. 6 schematically shows a controller according to a first embodiment of the invention, together with an engine to which the controller is applied.

An engine 1 shown is a vehicle-mounted direct-injection engine in which fuel is directly injected into a cylinder (combustion chamber 12). The cylinder 1A is comprised of four cylinders, for example, each cylinder having a piston 15 slidably inserted therein. A combustion chamber 12 is defined above the piston 15. The combustion chamber 12 is fitted with an ignition plug 4 and a fuel injection valve 3 in a predetermined manner. An intake passage 8 is communicated with the combustion chamber 12 via an intake valve 5. An exhaust passage 13 is communicated with the combustion chamber 12 via an exhaust valve 6. In the intake passage 8, there are disposed, for example, an airflow sensor 14 for measuring the mass of intake air introduced into the combustion chamber 12 and an electrically controlled throttle valve 2 for adjusting the mass of intake air. In the exhaust passage 13, there are disposed, for example, a three-way catalyst 7 as an exhaust purifying device and an air-fuel ratio sensor 16 for detecting the air-fuel ratio of the exhaust gas upstream of the three-way catalyst 7. Furthermore, in the cylinder 1A, there is disposed a water temperature sensor (not shown) or the like for detecting the temperature of engine cooling water, for example. The cylinder is also equipped, for example, with a crank angle sensor 9 for detecting the phase and the number of rotations (engine r.p.m.) of the crank shaft 11.

The intake valve 5 and the exhaust valve 6 are opened and closed by variable valve-operating mechanisms 5A and 6A comprised of electromagnetic coils or the like. The duration and timing of open/close operations and the amount of lift can be changed as desired.

Fuel is injected via the fuel injection valve 3 toward the air introduced into the combustion chamber 12 via the intake passage 8 and the intake valve 5, whereby a mixture gas of a predetermined air-fuel ratio (target air-fuel ratio) is formed. The mixture gas is ignited by a spark produced by the ignition plug 4 at a predetermined ignition timing and it feeds combustion. The pressure caused by the combustion pushes down the piston 15, thus providing a driving force for the engine. The exhaust gas following the ignition and combustion is delivered from the combustion chamber 12 to the three-way catalyst 7 via the exhaust passage 13. In the three-way catalyst 7, the HC, CO, and NOx components are purified and the purified exhaust gas is discharged to the outside.

Figure 7:
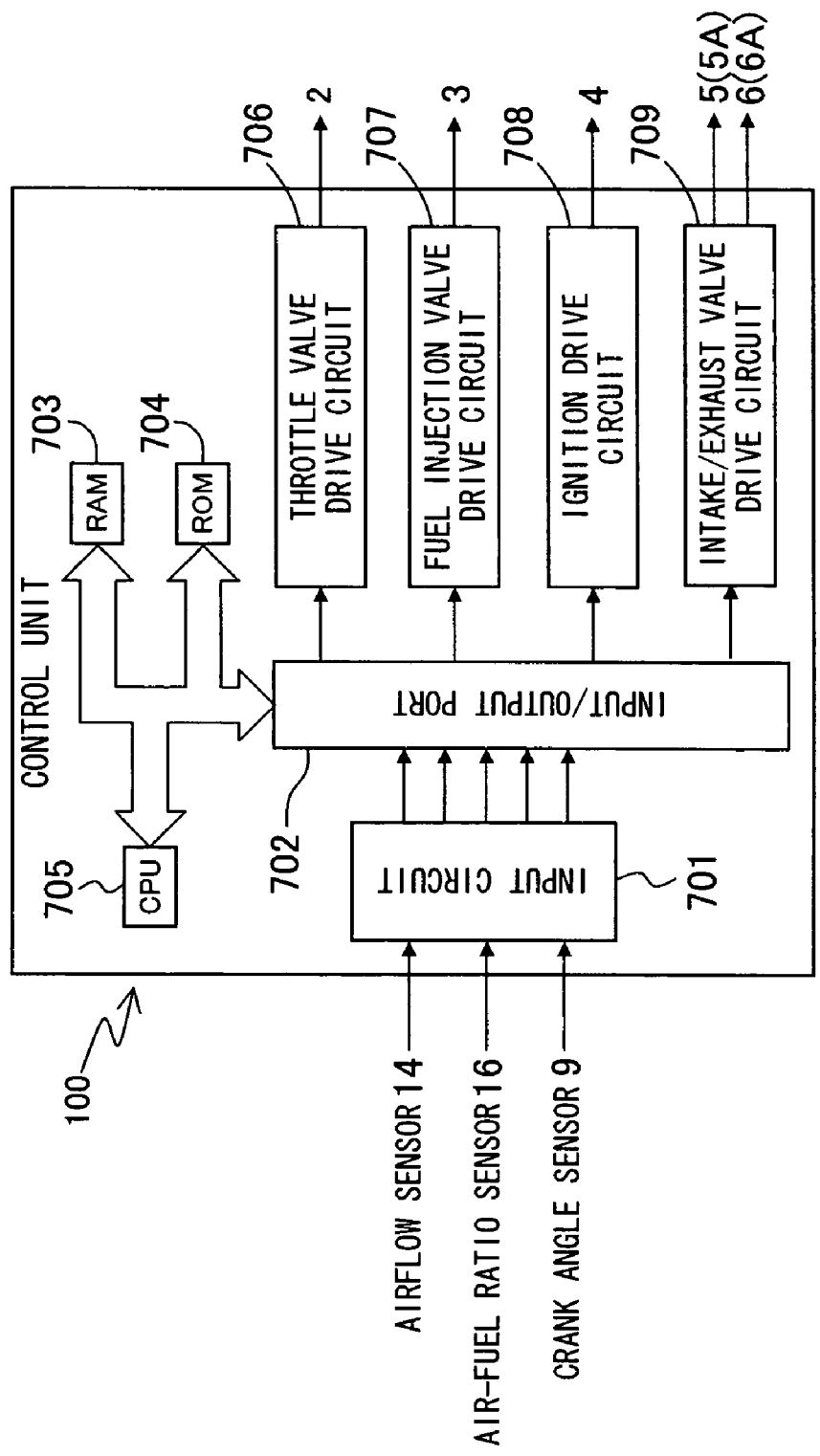
FIG. 7 shows the internal structure of a control unit.

The controller 10 of the present embodiment includes a control unit 100 that constitutes a main part of the controller. The control unit 100 controls the opening angle (intake air mass) of the throttle valve 2, the mass of fuel injected by the fuel injection valve 8, and the ignition timing of the ignition plug 4, for example. The control unit 100, as shown in FIG. 7, includes an input circuit 701 to which outputs of the aforementioned airflow sensor 14, air-fuel ratio sensor 16, and the crank angle sensor 9, for example, are fed. The outputs of the input circuit are sent to an input/output port 702. Input port values in the input port 702 are stored in RAM 703 and arithmetically processed in CPU 705. A control program describing the contents of arithmetic processing is written in ROM 704 in advance. Values calculated in accordance with the control program and indicating the control quantities of actuators, such as the aforementioned throttle valve, are once stored in RAM 32 and then delivered to output ports in the input/output port 702, from which they are sent to the individual actuators via drive circuits 706, 707, 708, and 709. Thus, the control unit 100 detects the operating condition of the engine based on the individual sensor outputs and then calculates optimum opening angle of the throttle valve 2 (throttle opening angle), the mass of fuel injected by the fuel injection valve 8, ignition timing of the ignition plug 4, and the mode of opening or closing of the intake valve 5 and the exhaust valve 6 (i.e., open/close duration, valve-open timing, and amount of lift).

The fuel injection mass calculated by the control unit 100 is converted into a valve-open pulse signal (injection valve drive signal) which is then fed to the fuel injection valve 3. A drive signal is also sent to the ignition plug 4 so as to cause ignition at the ignition timing calculated by the control unit 100. A drive signal is also sent to the electrically controlled throttle valve 2 so that a throttle opening angle calculated by the control unit 100 can be obtained. Valve drive signals are sent to the variable valve-operating mechanisms 5A and 5B so that the open/close modes (open/close duration, valve-open timing, and amount of lift) of the intake valve 5 and exhaust valve 6 calculated by the control unit 100 can be obtained.

Modes of combustion in the engine 1 include stoichiometric combustion, homogeneous-charge lean combustion, and stratified-charge lean combustion. In stoichiometric combustion, the air-fuel ratio of the mixture gas that feeds combustion ranges from stoichiometry to rich, wherein fuel is injected during the intake stroke and mixed with air so that a homogeneous mixture gas is combusted. In homogeneous-charge lean combustion, the air-fuel ratio of the mixture gas ranges from stoichiometry to lean, wherein, as in stoichiometric combustion, fuel is injected during the intake stroke and mixed with air so that a homogeneous mixture gas is combusted. In stratified-charge lean combustion, fuel is injected during the compression stroke and caused to become distributed in the mixture gas in layers such that the fuel is gathered near the ignition plug 4, whereby an air-fuel ratio even leaner than the homogeneous-charge lean combustion is realized.

Figure 8:
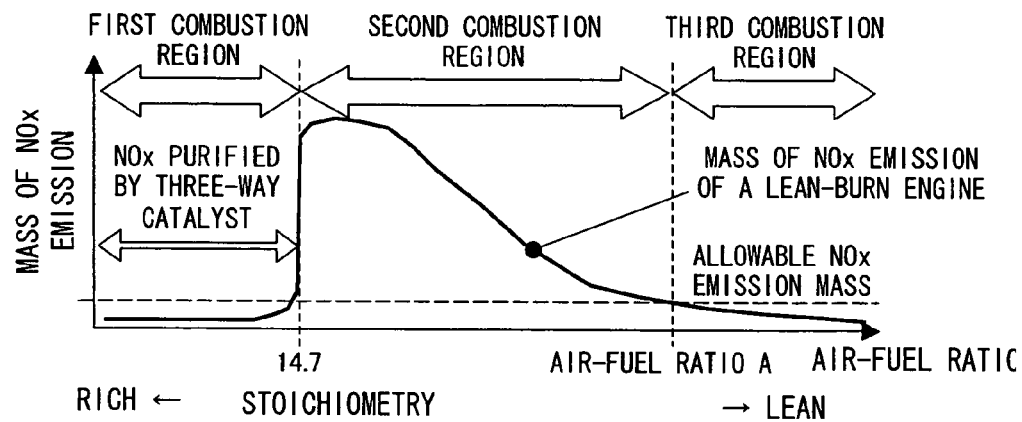
FIG. 8 shows the relationship between the air-fuel ratio and the mass of NOx emission, and the relationship between the air-fuel ratio and combustion regions.

FIG. 8 shows the relationship between the air-fuel ratio of mixture gas and the mass of NOx emission downstream of the exhaust purifying device (three-way catalyst 7) in the engine 1. In the air-fuel ratio region richer than stoichiometry, the purifying rate of the three-way catalyst 7 is high and the NOx in the exhaust gas discharged from the combustion chamber 12 into the exhaust passage 13 is purified, resulting in reduced mass of NOx emission to the outside. On the other hand, in the air-fuel ratio region from stoichiometry to lean, the NOx purifying rate of the three-way catalyst 7 is very low and the mass of NOx emission to the outside increases.

A first combustion region, a second combustion region, and a third combustion region, which are divided depending on the air-fuel ratio of the mixture gas fed for combustion, are defined as follows. The first combustion region is defined as an air-fuel ratio region from stoichiometry to rich in which the NOx purifying rate of the three-way catalyst 7 is high and the NOx emission downstream of the three-way catalyst 7 are on the order of dozens of ppm. The second combustion region is defined as an air-fuel ratio region from stoichiometry to lean, or more specifically, between stoichiometry and air-fuel ratio A in FIG. 8. Air-fuel ratio A is an air-fuel ratio such that the NOx emission are within a permissible NOx level, which is on the order of dozens of ppm. The third combustion region is defined as an air-fuel ratio region from air-fuel ratio A to lean.

In the following, a control is described that is performed for minimizing the NOx emission and torque variation when the second combustion region is passed, namely, upon switching of the combustion region from the first combustion region to the third combustion region via the second combustion region, or from the third combustion region to the first combustion region via the second combustion region.

Figure 9:
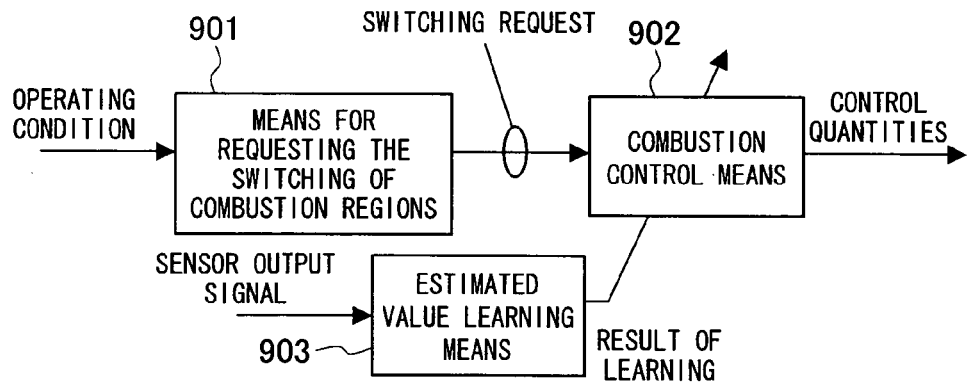
FIG. 9 shows a functional block diagram illustrating the contents of processing performed by the control unit during the switching of combustion regions.

FIG. 9 shows a functional block diagram of the processes performed by the control unit 100 during the combustion region switching. The processes are performed by a means 901 for requesting the switching of combustion regions, a combustion control means 902 for switching combustion regions, and an estimated value learning means 903 for learning estimated values used for the switching of combustion regions.

Figure 1:
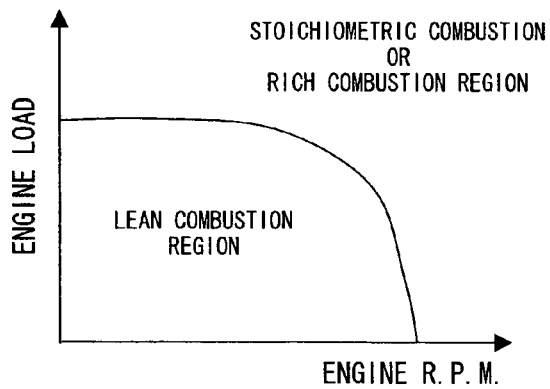
FIG. 1 shows an example of a stoichiometric or rich combustion region and a lean combustion region.
Figure 2:
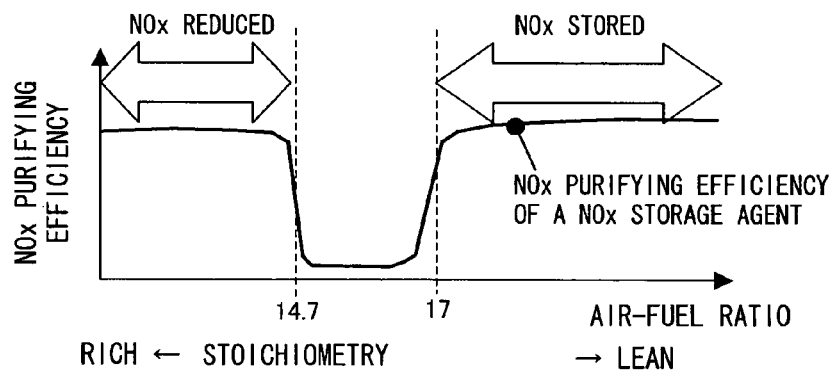
FIG. 2 shows the relationship between the air-fuel ratio and the NOx purifying efficiency of a lean NOx catalyst.
Figure 3:
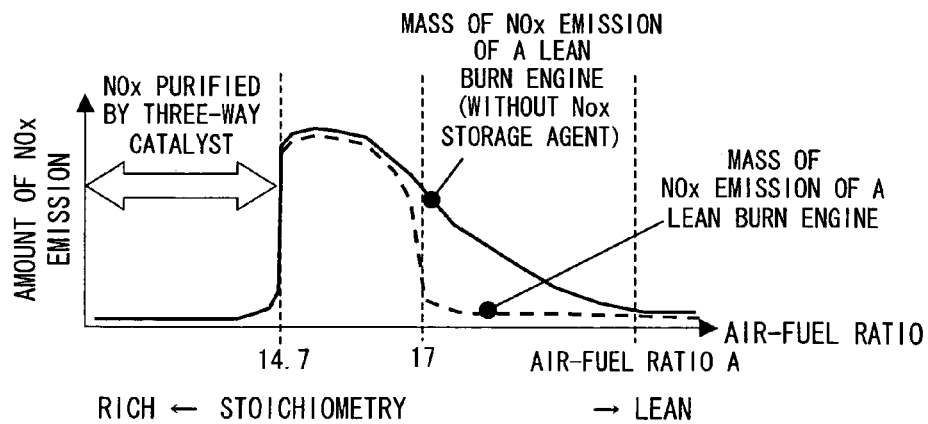
FIG. 3 shows the relationship between the air-fuel ratio and the mass of NOx emission in a lean-burn engine equipped with a three-way catalyst.
Figure 4:
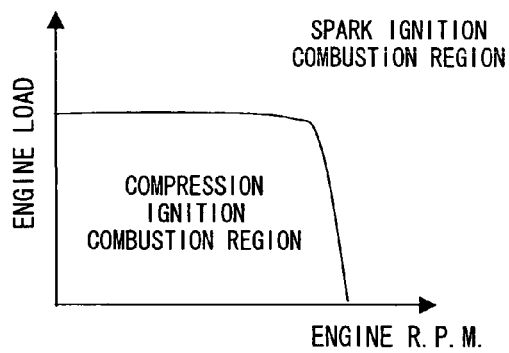
FIG. 4 shows operating ranges for spark ignition combustion and compression ignition combustion.

The means 901 for requesting the switching of combustion regions reads the engine r.p.m., engine torque, accelerator opening angle, water temperature, and catalyst temperature, for example, and determines whether or not to carry out the switching of combustion regions based on such information. The result of determination is sent to the combustion control means 902. For example, when there is provided a map of the lean-combustion-enabled region that is related to the engine r.p.m. and the engine load (torque), as shown in FIG. 1, a target engine torque is calculated from the accelerator opening angle. If the current r.p.m. and the target engine torque are in the lean-combustion-enabled region of the aforementioned map, it is determined whether or not it is possible to switch the combustion region from stoichiometric combustion to lean combustion. If the switching is possible, the means 901 for requesting the switching of combustion regions sends a request for switching combustion regions to the combustion control means 902. The combustion control means 902 calculates control quantities necessary for suppressing the NOx emission and torque variation upon switching of combustion region from the first combustion region to the third combustion region or from the third combustion region to the first combustion region in accordance with the switching request.

Figure 10:
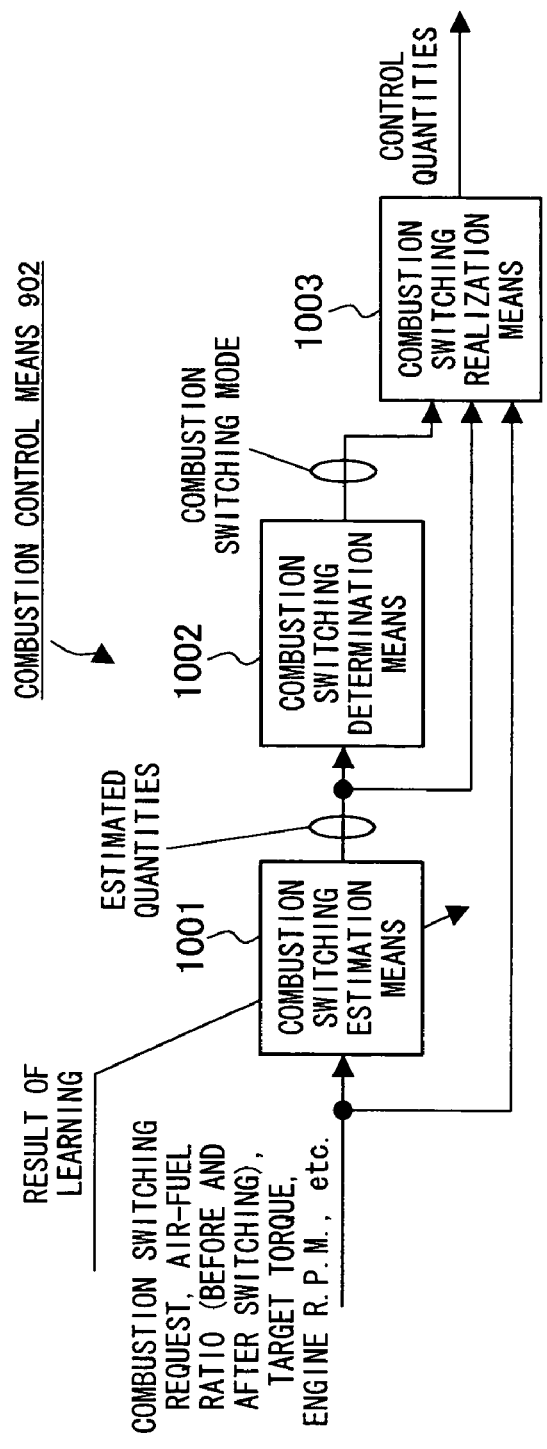
FIG. 10 shows a functional block diagram illustrating the details of a combustion control means shown in FIG. 9.
Figure 11:
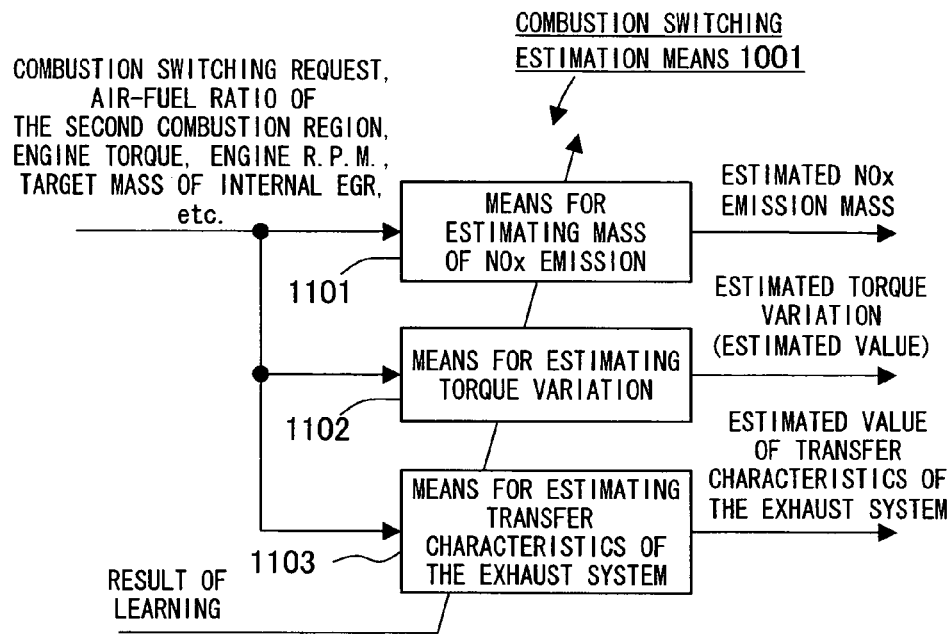
FIG. 11 shows a functional block diagram illustrating the details of a combustion switching estimation means shown in FIG. 10.

The combustion control means 902 includes a combustion region switching estimation means 1001, a combustion region switching determination means 1002, and a combustion region switching realization means 1003, as shown in FIG. 10. The combustion region switching estimation means 1001, as shown in FIG. 11, includes a Means 1101 for estimating the mass of NOx emission, a means 1102 for estimating torque variation, and an exhaust-system transfer characteristics estimation means 1103. These estimation means estimate the mass of NOx emission upon switching of combustion regions, the torque variation, and the transfer characteristics of the exhaust system from the start of switching of combustion regions to when the air-fuel ratio at the entrance to the three-way catalyst 7 changes, respectively. The estimated values are updated using the result of learning, as will be described later.

Figure 12:
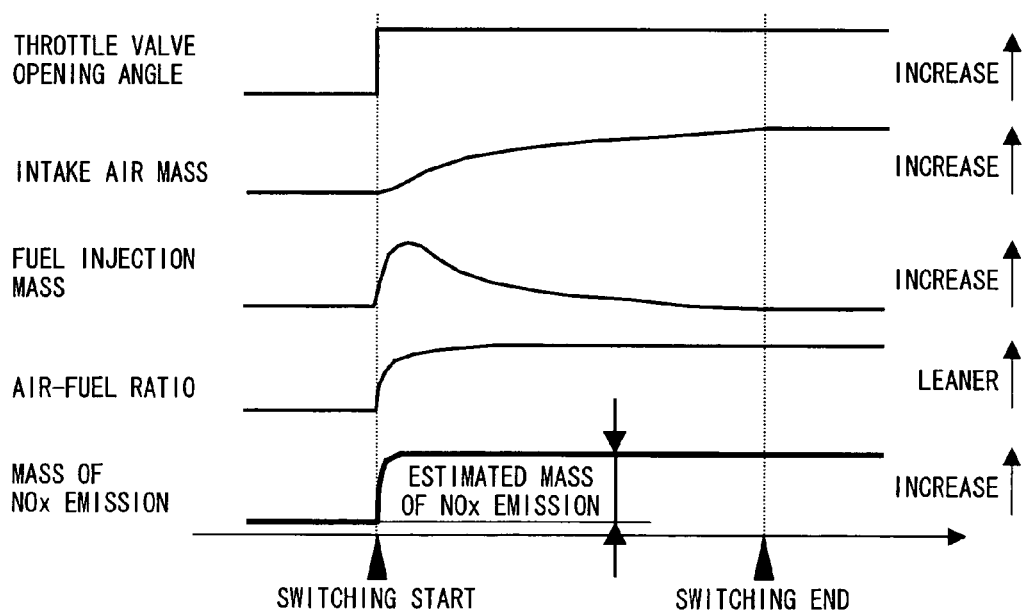
FIG. 12 shows a time chart illustrating the relationship between the manipulation of the intake air mass and fuel injection mass and the mass of NOx emission upon switching of combustion regions.

The Means 1101 for estimating the mass of NOx emission estimates (calculates) the mass of NOx discharged upon switching of combustion regions based upon the air-fuel ratio of the mixture gas based on a request for switching combustion regions, the air-fuel ratio of the mixture gas upon passing of the second combustion region, engine torque, engine r.p.m., and the mass of exhaust gas remaining in the combustion chamber 12 (internal EGR mass), for example. The thus estimated mass of NOx emission (estimated value) is sent to the combustion region switching determination means 1002. The Means 1101 for estimating the mass of NOx emission is based on a dynamic model of NOx emitted by the engine. The dynamic NOx model is used, for example, to estimate the mass of NOx emission from the combustion chamber 12 when the throttle valve opening angle and the mass of fuel supply (fuel injection mass) are changed in accordance with a request for changing the air-fuel ratio upon switching of combustion regions, as shown in FIG. 12. More specifically, based on the air-fuel ratio of the second combustion region upon switching of combustion regions in a period T1, the NOx concentration in the exhaust gas is calculated at periods T2 that are sufficiently shorter than period T1. The NOx concentration is accumulated at periods T2 so as to estimate the mass of NOx emission upon switching of combustion regions. It should be noted that the torque is assumed to be constant prior to and after the switching of combustion regions (excluding the period of switching). This dynamic NOx model also takes into consideration the NOx purifying efficiency of the three-way catalyst 7 based on a model thereof.

The means 1102 for estimating torque variation estimates (calculates) the torque variation caused upon switching of combustion regions, based on a request for switching combustion regions, the air-fuel ratio upon passing of the second combustion region, engine r.p.m., and the like. The thus estimated torque variation (estimated value) is sent to the combustion region switching determination means 1002. The means 1102 for estimating torque variation is based on a dynamic model of the output torque produced by the engine. The dynamic torque model is used, for example, to estimate the torque variation caused upon manipulating the intake air mass and the fuel supply mass (mass injected for combustion), via the throttle valve 2, and the ignition timing, in accordance with a request to change the air-fuel ratio upon switching of combustion regions, as shown in FIG. 13. More specifically, for example, a torque variation component is calculated from the mass of correction of the fuel injection mass upon switching of combustion regions. Another torque variation component upon retarding the ignition timing is subtracted from the torque variation component due to the correction of the fuel injection mass. The maximum value of torque variation is estimated to be the of torque variation upon switching of combustion regions. The torque is assumed to be constant before and after the switching of combustion regions.

The means 1103 for estimating the transfer characteristics of the exhaust system estimates the transfer characteristics of the exhaust system from when the air-fuel ratio of the mixture gas that feeds combustion changed to when the air-fuel ratio at the entrance to the three-way catalyst 7 changes, based on the request for switching combustion regions, the air-fuel ratio in the second combustion region, engine torque, engine r.p.m., and the like. More specifically, as shown in FIG. 14, for example, there is provided a time constant map of the change in air-fuel ratio at the entrance to the three-way catalyst 7 that is related to the amount of change in air-fuel ratio before and after the switching of combustion regions and to the engine r.p.m. Based on the amount of change in the target air-fuel ratio and the engine r.p.m., an exhaust air-fuel ratio response time constant, which is a time constant between the combustion chamber 12 and the entrance to the three-way catalyst 7, is estimated. The model may also take into consideration the engine cycle.

Figure 15:
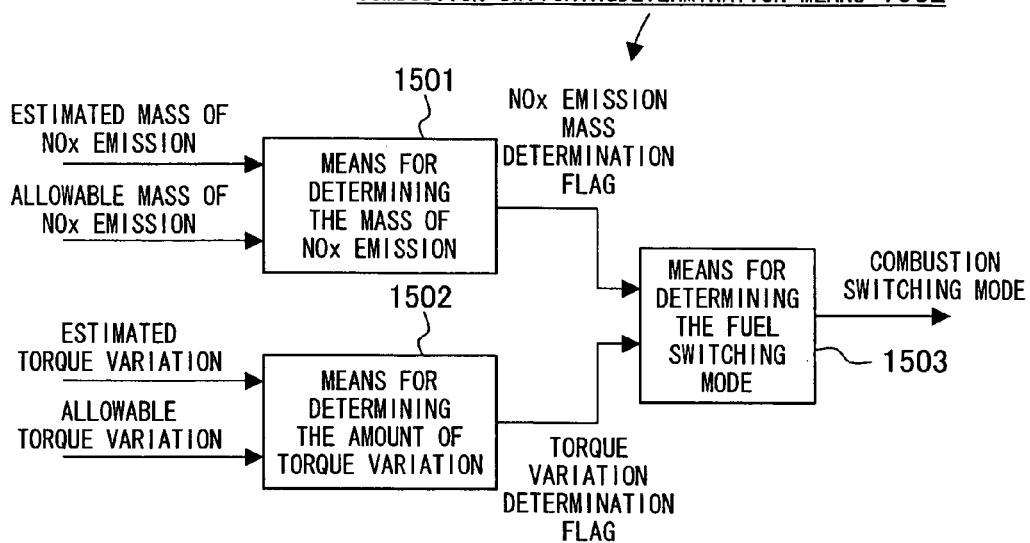
FIG. 15 shows a functional block diagram illustrating the details of a means for requesting the switching of combustion regions shown in FIG. 10.

The combustion region switching determination means 1002, as shown in FIG. 15, includes a NOx emission mass determination means 1501, a torque variation determination means 1502, and a means 1503 for determining the mode of combustion region switch. Upon switching of combustion regions, it is determined whether or not the mass of NOx emission and the torque variation exceed predetermined values so as to determine a combustion region switching mode by which a method for switching combustion regions is determined.

The NOx emission mass determination means 1501 determines whether or not the estimated NOx emission mass (estimated value) exceeds the allowable NOx emission mass (allowable value). The allowable NOx emission mass is a quantity of NOx emissions allowed upon switching of combustion regions. After this determination, a NOx emission mass determination flag is sent to the combustion region switching mode determination means 1503. More specifically, for example, if the estimated NOx emission mass exceeds the allowable NOx emission mass, a NOx emission mass determination flag is turned on.

The torque variation determination means 1502 determines whether or not the estimated torque variation (estimated value) exceeds the allowable torque variation (allowable value). The allowable torque variation is an amount of torque variation allowed upon switching of combustion regions. After this determination, a torque variation determination flag is sent to the combustion region switching mode determination means 1503. More specifically, for example, if the estimated torque variation exceeds the allowable torque variation, the torque variation determination flag is turned on.

Based on the NOx emission mass determination flag and the torque variation determination flag, the combustion region switching mode determination means 1503 determines which combustion region switching mode is to be employed, and sends the result of determination to the combustion region switching realization means 1003. More specifically, for example, when the NOx emission mass determination flag is off and the torque variation determination flag is off, it is determined that the increase in exhaust emissions and the deterioration of operability can be suppressed upon switching of combustion regions by manipulating (changing) the intake air mass and fuel injection mass via the throttle valve 2 and the ignition timing. Then, the opening angle of the throttle valve 2, fuel injection mass, and ignition timing are controlled so as to select a combustion region switching mode 1 for the switching of combustion regions. In another example, when the NOx emission mass determination flag is on and the torque variation determination flag is on, it is determined that it is difficult to suppress the increase in exhaust emissions and the deterioration of operability even if the intake air mass and fuel injection mass via the throttle valve 2 and the ignition timing are changed. Thus, in this case, a combustion region switching mode 2 is selected whereby the switching of combustion regions is realized by manipulating the intake air valve 5, which is capable of introducing air into the combustion chamber 12 with a smaller time delay than the time delay of intake air between the throttle valve 2 and the combustion chamber 12, thus changing the intake air mass alone. These are merely examples and other modes of combustion region switching that are adapted to the states of the NOx emission mass determination flag and the torque variation determination flag may be provided. Alternatively, a combustion region switching mode may be outputted that includes a preparatory stage prior to the switching of combustion regions.

Figure 16:
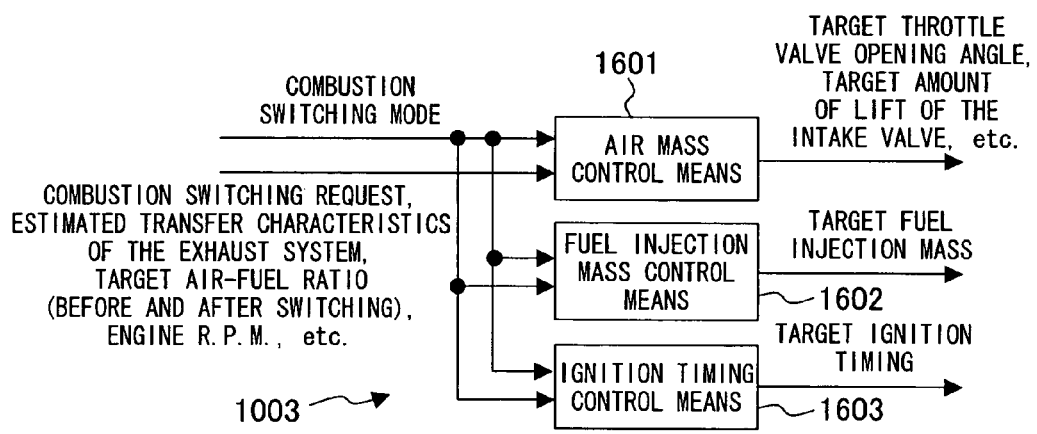
FIG. 16 shows a functional block diagram illustrating the details of a means for realizing the switching of combustion regions shown in FIG. 10.

The combustion region switching realization means 1003 includes an air mass control means 1601, a fuel injection mass control means 1602, and an ignition timing control means 1603, as shown in FIG. 16.

The air mass control means 1601 calculates intake air mass control quantities based on the request for switching combustion regions, the estimated transfer characteristics of the exhaust system (time constant of the exhaust air-fuel ratio response), the air-fuel ratio upon passing the second combustion region, engine r.p.m., and the combustion region switching mode, for example. Examples of the intake air mass control quantities are a target opening angle of the throttle valve, a target lift amount of the intake valve, a target duration of opening or closing of the intake valve, and a target timing of opening or closing of the intake valve, for example.

The fuel injection mass control means 1602 calculates a target fuel injection mass based on the request for switching combustion regions, the estimated transfer characteristics of the exhaust system (time constant of the exhaust air-fuel ratio response), the air-fuel ratio before and after the switching of combustion regions, engine r.p.m., and the combustion region switching mode, for example.

The ignition timing control means 1603 calculates a target ignition timing based on the request for switching combustion regions, the estimated transfer characteristics of the exhaust system (time constant of the exhaust air-fuel ratio response), the air-fuel ratio before and after the switching of combustion regions, engine r.p.m., and the combustion region switching mode, for example.

Each of the control means 1601, 1602, and 1603 of the combustion region switching realization means 1003 has an exhaust system inverse model based on an exhaust system model that estimates the change in air-fuel ratio at the entrance to the three-way catalyst 7 based on the change of air-fuel ratio of the mixture gas feeding combustion. The control means are operated so as to compensate the delay in the change of air-fuel ratio at the entrance to the three-way catalyst 7 in response to the change in the air-fuel ratio of the mixture gas, based on the estimated transfer characteristics of the exhaust system (time constant of the exhaust air-fuel ratio response), thereby suppressing the increase in exhaust emissions. More specifically, for example, when it is estimated that the switching of the exhaust air-fuel ratio would take more than a predetermined time despite the control of the intake air mass by the air mass control means 1601 such that the time delay in the change of the exhaust air-fuel ratio can be compensated, the fuel injection mass is corrected such that the switching of the exhaust air-fuel ratio can be realized within a predetermined time. Furthermore, the torque variation caused by the correction of the fuel injection mass are suppressed by correcting the ignition timing.

By performing these controls when switching the combustion regions from the first to the third combustion region or from the third to the first combustion region, the mass of NOx emission during the passing of the second combustion region and the torque variation can be reduced below predetermined values. Thus, the increase in exhaust emissions and the deterioration of operability can be suppressed.

However, because the controller 10 including the sensors, as well as the engine 10 according to the present embodiment are adjusted at the factory, their conditions may have deteriorated over time. For example, if the mass of NOx emission is estimated to be lower than it actually is, the combustion region switching mode selected by the combustion region switching mode determination means 1503 would be erroneous. As a result, the switching of combustion regions could proceed while the NOx emission are allowed to increase, thereby failing to effectively suppress the increase in exhaust emissions.

Thus, the control unit 100, as shown in FIG. 9, is provided with the estimated value learning means 903 whereby outputs of various sensors are compared with estimated values. If there is a difference that exceeds a predetermined value, such difference is learned and the combustion region switching estimation means 1001 is updated so as to suppress the increase in exhaust emissions and the deterioration of operability due to changes over time or manufacturing variations.

More specifically, when, for example, the system is provided with a means (such as a NOx sensor) for detecting the mass (concentration) of NOx in the exhaust gas downstream of the three-way catalyst 7, which is not shown in FIG. 6, the mass of NOx emission is learned based on the output of such NOx sensor, and the estimated value of the mass of NOx emission is corrected with the result of learning. Furthermore, when there is provided a means (such as a torque sensor) for detecting the engine torque, the engine torque is learned based on the output of such torque sensor and the estimated value of the torque variation is corrected with the result of learning.

Errors due to the deterioration of the exhaust purifying device (three-way catalyst 7) or the like are dealt with by learning the exhaust system transfer characteristics based on the output of the air-fuel ratio sensor 16 provided upstream of the exhaust purifying device 7 and then correcting the estimated value of the exhaust system transfer characteristics with the result of learning.

Figure 17:
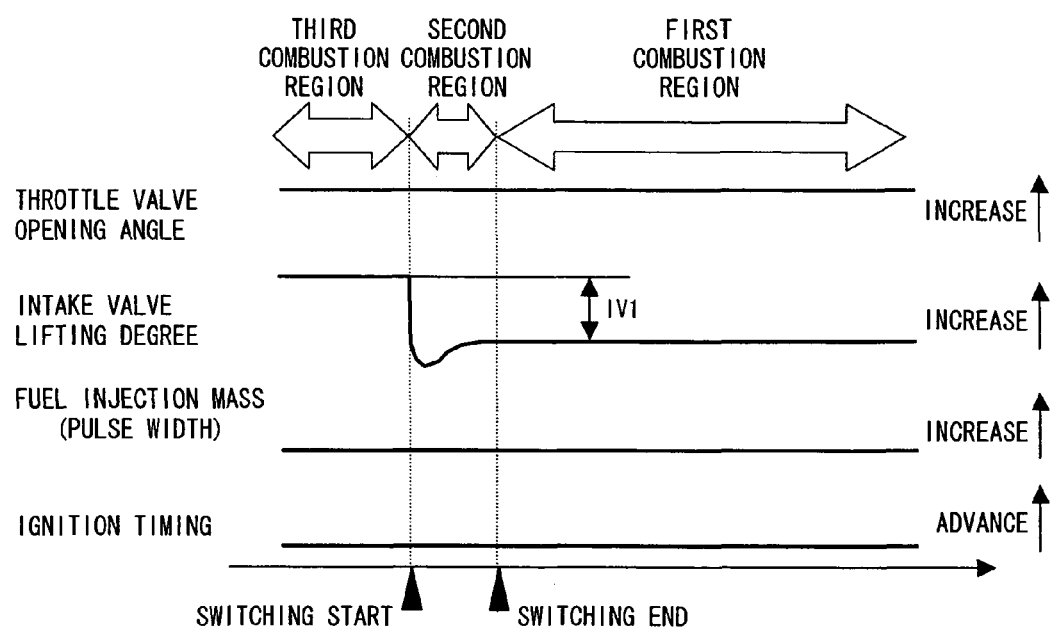
FIG. 17 shows a time chart for the explanation of a control operation during the switching of combustion regions in a first embodiment.

FIG. 17 shows an example of switching control for a case where, upon switching of combustion regions from the third combustion region to the first combustion region, the NOx emission and torque variation exceed allowable values when the intake air mass and the fuel injection mass are manipulated simultaneously. The example involves a switching control in a steady state (where the torque is constant).

FIG. 17 also shows individual target values of the opening angle of the throttle valve 2, the amount of lift of the intake valve 5, fuel injection mass (fuel injection pulse width), and ignition timing, in time sequence (the opening angle, the lift amount, and the fuel injection mass each increasing and the ignition timing advancing in the upward direction).

The relationship between the intake air mass introduced into the combustion chamber 12 and the amount of lift IV1 of the intake valve 5 or the lift time thereof varies depending on operating conditions such as the engine r.p.m. and the load. Therefore, it is necessary to determine the relationship between the intake air mass and the mass of lift IV1 of the exhaust valve or the lift time thereof in each operating condition in advance through experiments or simulation, and to retain it as a map or model.

Upon request from the driver to accelerate during operation in the third combustion region, for example, the combustion region switching requesting means 901 determines that the combustion regions have been switched from the third combustion region to the first combustion region. In response to the request for switching combustion regions, the combustion control means 902 starts to control the engine 10 such that the thus requested switching of the combustion regions is realized.

First, the estimated mass of NOx emission (estimated value), the estimated torque variation (estimated value), and the estimated value of the exhaust system transfer characteristics upon switching of combustion regions are calculated. Then, the estimated mass of NOx emission thus calculated and the allowable mass of NOx emission are compared so as to determine whether or not the former exceeds the latter. At the same time, the estimated torque variation and the allowable torque variation are compared so as to determine whether or not the former exceeds the latter. In the present example, it is assumed that both exceed the respective allowable values, and, based on such two determinations, it is determined that, in order to suppress the increase in exhaust emissions and to suppress the deterioration of operability, it is appropriate to switch the air-fuel ratio by changing the intake air mass alone by manipulating the intake valve 5 (i.e., the lift amount thereof). Thus, a combustion region switching mode whereby the intake valve 5 alone is manipulated is selected.

In accordance with the selected combustion region switching mode, each control quantity is controlled. Because of the manipulation of the air mass through the intake valve 5 alone, the target throttle valve opening angle, the target fuel injection mass (pulse width), and the target ignition timing are set to be constant during the switching of combustion regions. As the switching of combustion regions begins, the lift amount of the intake valve 5 is changed to the lift amount IV1 for realizing the air-fuel ratio for the first combustion region, while the delay in the exhaust system is compensated. In this way, the switching of combustion regions from the third combustion region to the first combustion region is carried out while suppressing the increase in exhaust emissions and the deterioration of operability.

Figure 18:
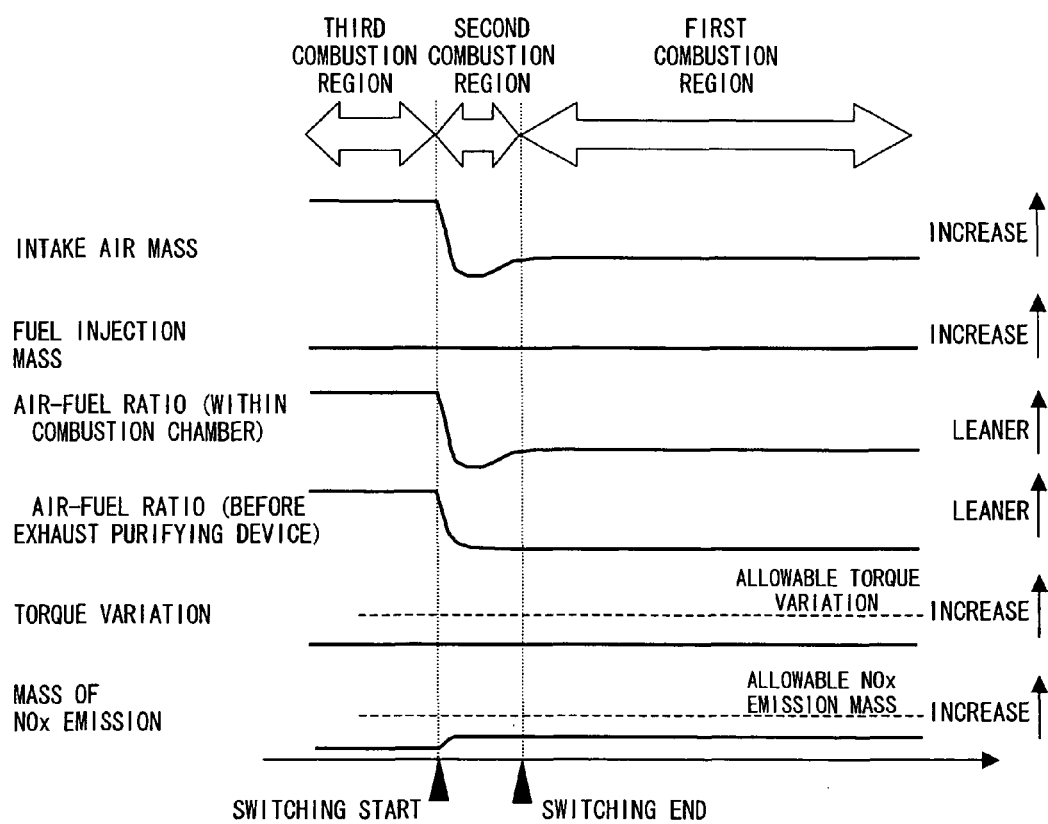
FIG. 18 shows a time chart for the explanation of operation during the switching of combustion regions in the first embodiment.

FIG. 18 shows the intake air mass, fuel injection mass, air-fuel ratio in the combustion chamber 12, air-fuel ratio at the entrance to the three-way catalyst 7, torque variation, and the NOx concentration at the exist of the three-way catalyst 7 in time series upon executing the control (where, in the upward direction, the air mass and fuel injection mass increase, the air-fuel ratio becomes leaner, and the torque variation and the NOx concentration increase).

In such control, when the combustion regions are switched from the third combustion region to the first combustion region, the amount of lift of the intake valve 5 is adjusted in accordance with the combustion region switching mode such that the delay in the change of air-fuel ratio between the combustion chamber 12 and the three-way catalyst 7 can be compensated. Thus, the intake air mass decreases. Since the fuel injection mass is constant before and after the switching of combustion regions, the air-fuel ratio of the mixture gas in the combustion chamber 12 changes in accordance with the intake air mass, namely, from lean to stoichiometry, without producing torque variation. Further, the air-fuel ratio at the entrance to the three-way catalyst 7 can be switched in a short time on account of the exhaust system delay compensation, so that the NOx emission can be reduced.

Because the estimated mass of NOx emission, the estimated torque variation, and the estimated transfer characteristics of the exhaust system are adjusted at the factory, they might have become less than appropriate over time. However, the increase in exhaust emissions and the deterioration of operability can be suppressed by the learning of the outputs of the NOx sensor, torque sensor, and air-fuel ratio sensor.

Figure 19:
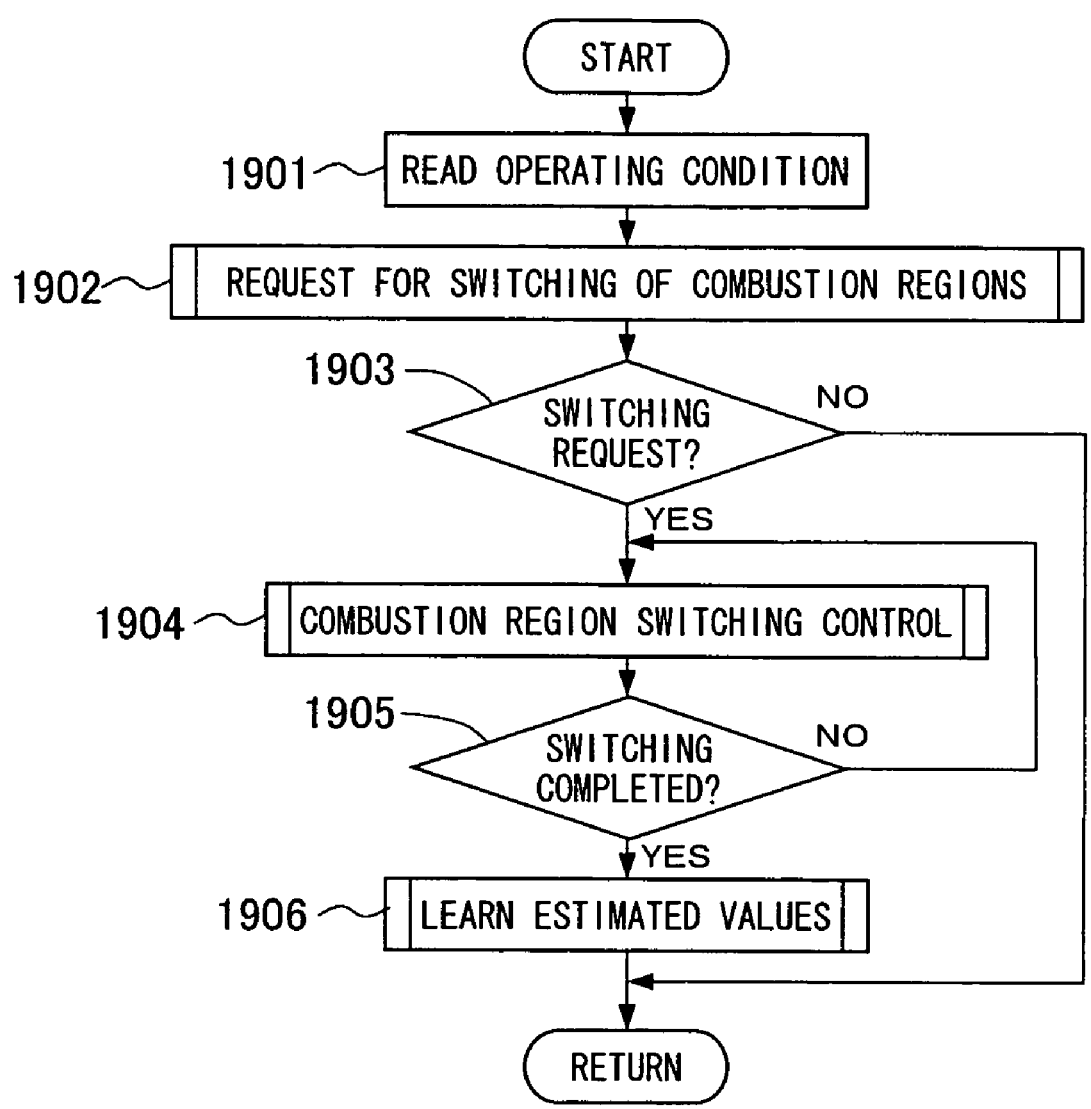
FIG. 19 shows a flowchart of an example of a program executed by the control unit during the switching of combustion regions.

FIGS. 19 to 22 show flowcharts of examples of programs executed by the control unit 100 upon switching of combustion regions. FIG. 19 corresponds to the functional block diagram of FIG. 9.

Referring to the flowchart of FIG. 19, at step 1901, operating conditions (such as the engine r.p.m., accelerator opening angle, cooling water temperature, and catalyst temperature, for example) are read from individual sensors. At step 1902, it is determined whether or not the combustion state should be switched before proceeding to step 1903.

At step 1903, it is determined whether or not there is a request for switching combustion regions. If there is, the routine proceeds to step 1904, at which a combustion region switching control is performed. The routine then proceeds to step 1905. If there is no request for switching combustion regions at step 1903, the routine returns.

At step 1905, it is determined whether or not the switching of combustion regions has been completed. Until the combustion region switching control is completed, it and the completion determination are repeated by returning back to step 1904. Once it is determined that the combustion region switching has been completed, the routine proceeds to step 1906, at which the aforementioned individual estimated values are learned and corrected based on the output of the various sensors. The routine then returns.

Figure 20:
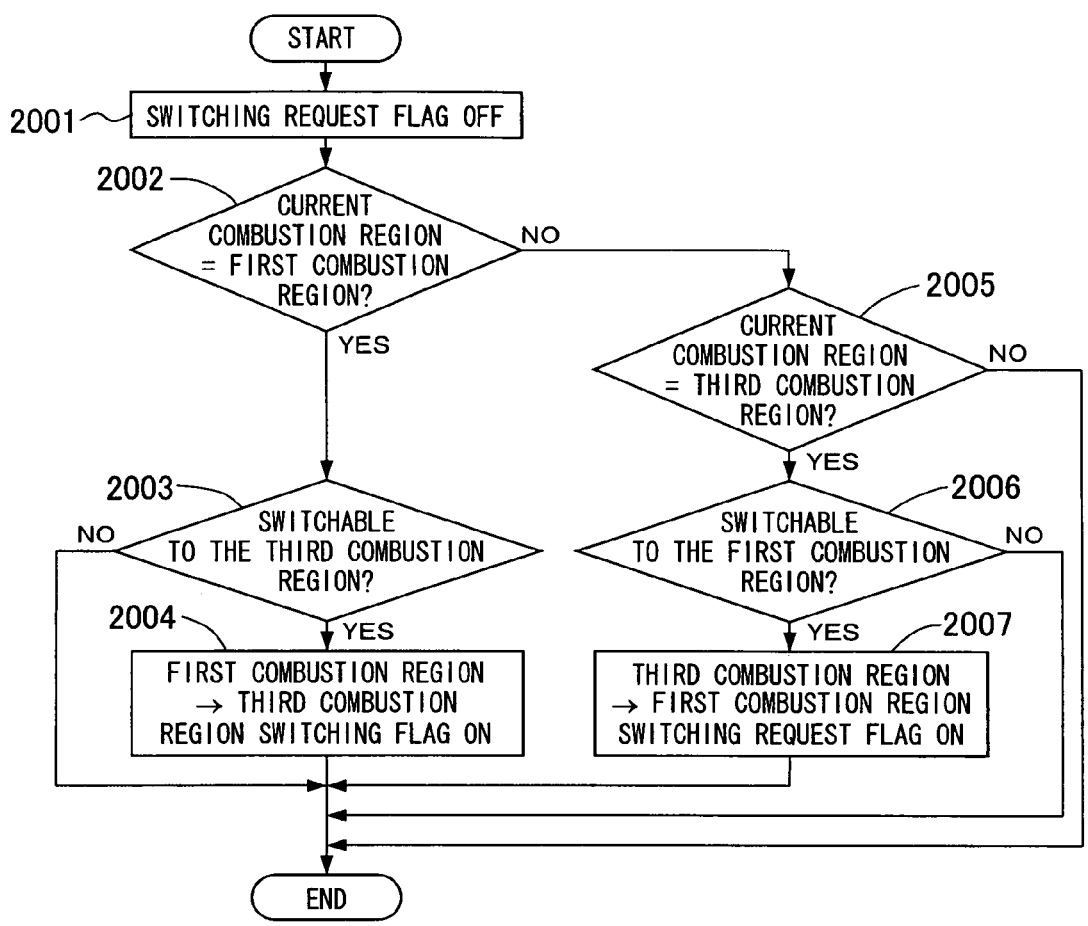
FIG. 20 shows a flowchart illustrating the details of a process for requesting the switching of combustion regions shown in FIG. 19.

FIG. 20 shows a flowchart illustrating the details of the routine for requesting the switching of combustion regions that is carried out at step 1902 of FIG. 19. At step 2001, a switching request flag is cleared (OFF). At step 2002, it is determined whether or not the current combustion region is the first combustion region. If it is the first combustion region, the routine proceeds to step 2003. If not (i.e., when the combustion region is either the second or third combustion region), the routine proceeds to step 2005.

At step 2003, it is determined whether or not it is possible to switch the combustion region from the first combustion region to the third combustion region. More specifically, in the map in which combustion regions are defined by the engine r.p.m. and the engine load, it is determined whether or not the current state is in the third combustion region. At the same time, conditions relating to the state of operation are checked. These include whether or not the engine r.p.m., the airflow mass, the change of accelerator opening angle, and the engine r.p.m. variation are within their respective predetermined values. If it is determined that the combustion region can be switched to the third combustion region, the routine proceeds to step 2004. If not, the routine ends. At step 2004, a request flag for switching the combustion region from the first combustion region to the third combustion region is turned on (ON), and then the routine ends.

On the other hand, at step 2005, it is determined whether or not the current combustion region is the third combustion region. If so, the routine proceeds to step 2006. If the combustion region is not the third combustion region, the routine ends. At step 2006, it is determined whether or not it is possible to switch the combustion region from the third combustion region to the first combustion region. More specifically, the possibility of combustion region switching is checked based on the conditions relating to the operating range and the operating condition using a map similar to the one used at step 2003. If the switching to the first combustion region is possible, the routine proceeds to step 2007. If not, the routine ends. At step 2007, a flag for switching the combustion region from the third combustion region to the first combustion region is turned on (ON), and then the routine ends.

Thus, in this combustion region switching routine, it is determined, based on the current operating condition or the like, whether or not it is possible to switch combustion regions. If the switching is possible, a particular switching mode is requested.

Figure 21:
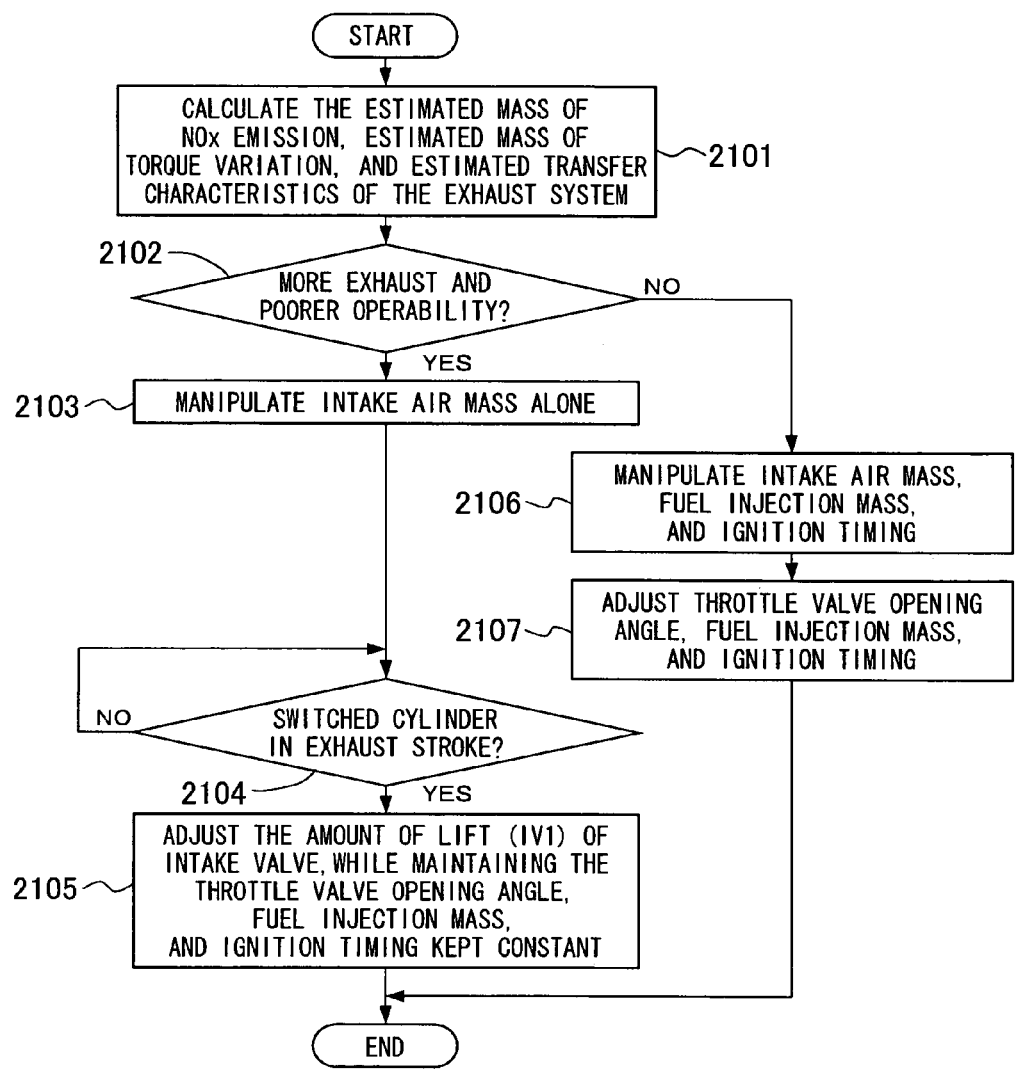
FIG. 21 shows a flowchart illustrating the details of a process for controlling the switching of combustion regions shown in FIG. 19.

FIG. 21 shows a flowchart illustrating the details of the combustion switching control routine carried out at step 1904 of FIG. 19. The flowchart involves an example in which the combustion regions are switched from the third combustion region to the first combustion region by means of the intake air mass alone, as in FIGS. 17 and 18. (Switching from the first combustion region to the third combustion region involves a substantially similar process and is not described herein.)

In this combustion switching control routine, the estimated NOx emission mass (estimated value), the estimated torque variation (estimated value), and the estimated transfer characteristics of the exhaust system (estimated value) upon switching of the combustion regions are calculated at step 2101. Then, the routine proceeds to step 2102, at which it is determined whether or not the exhaust emissions would increase and the operability would deteriorate if a conventional combustion region switching technique is used. More specifically, it is determined whether or not the estimated NOx emission mass is below the allowable NOx emission mass (allowed value), and whether or not the estimated torque variation is below the allowable torque variation (allowable value). If it is determined that there would be no increase in exhaust emissions and no deterioration in operability, the routine proceeds to step 2106.

At step 2103, a combustion region switching mode is requested. More specifically, for example, when the estimated NOx emission mass exceeds the allowable NOx emission mass and the estimated torque variation exceeds the allowable torque variation, it is requested that the air mass alone be changed upon switching of the combustion regions. In preparation for the switching of combustion regions, the combustion region switching mode may include a request that the throttle valve be operated so as to fill the collector with air and, simultaneously, that the intake valve 5 be operated so as to make the mass of air introduced into the combustion chamber 12 constant. After the request for a combustion region switching mode, the routine proceeds to step 2104. At step 2104, the routine stands by until the switched cylinder enters the exhaust stroke so that the intake air mass can be changed in the next intake stroke. Once the exhaust stroke is entered, the routine proceeds to step 2105, at which, in order to realize the switching of combustion regions in accordance with the combustion region switching mode, the amount of lift of the intake valve 5 is adjusted by just IV1 past a transition state based on the exhaust system transfer characteristics, and the routine ends. In this case, since it is the air mass alone that is changed, the throttle valve opening angle, fuel injection mass, and ignition timing are set to be constant.

On the other hand, at step 2106, because there is not going to be much increase in exhaust emissions or deterioration in operability upon switching of combustion regions even with a conventional technique, a fuel switching mode is requested whereby the intake air mass, fuel injection mass, and ignition timing are manipulated, and then the routine proceeds to step 2107. The fuel switching mode may include a preparatory operation prior to the switching of combustion regions, as at step 2103. At step 2107, the throttle valve opening angle, fuel injection mass, and ignition timing are adjusted.

In this way, the switching of combustion regions can be carried out based on the estimated NOx emission mass and the estimated torque variation, while the increase in exhaust emissions and the deterioration in operability can be suppressed.

Figure 22:
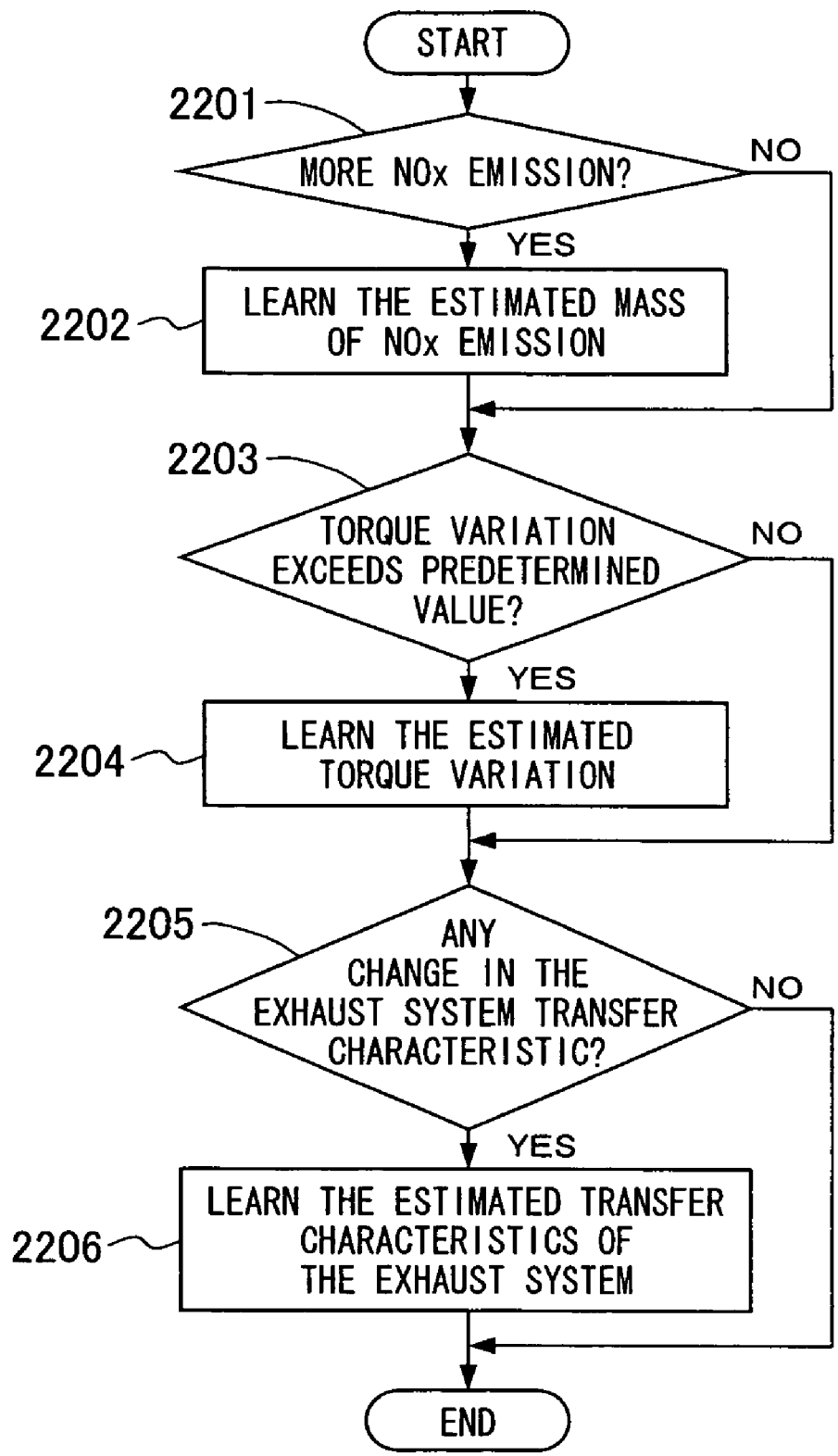
FIG. 22 shows a flowchart illustrating the details of a process for learning estimated values.

FIG. 22 shows a flowchart illustrating the details of the estimated value learning routine carried out at step 1906 of FIG. 19. The flowchart involves a case where there are provided a NOx sensor for detecting the mass of NOx emission downstream of the three-way catalyst 7 and a torque sensor for detecting the engine torque, while these are not shown in FIG. 6.

In this estimated value learning routine, at step 2201, the mass of NOx emission calculated based on the output of the NOx sensor is compared with the estimated NOx emission mass. If the difference between the two exceeds a predetermined value, the routine proceeds to step 2202. If the difference value is less than the predetermined value, the routine proceeds to step 2203. At step 2202, the difference in NOx emission mass is learned and the estimated NOx emission mass (estimated value) is corrected, before proceeding to step 2203.

At step 2203, the torque variation calculated based on the output of the torque sensor is compared with the estimated torque variation. If the difference between the two exceeds a predetermined value, the routine proceeds to step 2204. If the difference in the torque variation is less than the predetermined value, the routine proceeds to step 2205. At step 2204, the difference in the torque variation is learned and the estimated torque variation is corrected.

At step 2205, the exhaust system transfer characteristics calculated base don the output of the air-fuel ratio sensor are compared with the estimated transfer characteristics of the exhaust system. If the difference between the two exceeds a predetermined value, the routine proceeds to step 2206. If the difference is less than the predetermined value, the routine ends. At step 2206, the difference in the exhaust system transfer characteristics is learned and the estimated transfer characteristics are corrected.

In this way, the individual estimated values are corrected by learning based on the outputs of individual sensors or the like. As a result, the increase in exhaust emissions and the deterioration of operability due to changes over time and manufacturing variations can be suppressed.

Second Embodiment

Hereafter, a second embodiment of the controller according to the invention will be described. The basic structure of the controller according to this embodiment is the same as that of the first embodiment (see FIGS. 6 and 7). One difference is that the engine to which the controller is applied is a compression ignition engine. Namely, in the engine according to the present embodiment, as opposed to the first embodiment, not only the mixture gas is ignited by the ignition plug and combusted, but also a pre-mixed gas comprised of fuel and air is compressed and self-ignited.

Figure 23:
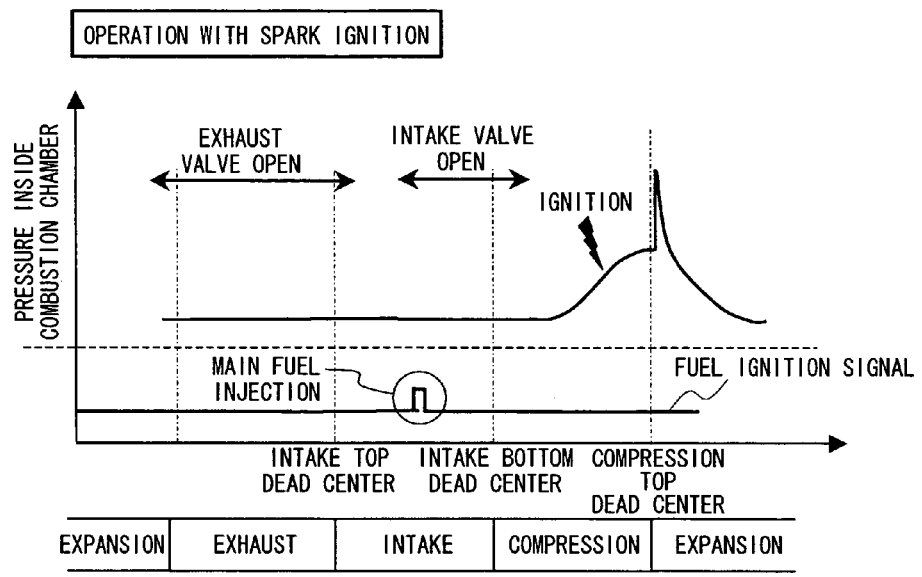
FIG. 23 shows a change in the pressure inside the combustion chamber during a cycle of spark ignition operation in a second embodiment of the invention.

FIG. 23 shows the relationship among the pressure inside the combustion chamber 12, a fuel injection signal, and ignition timing during the spark ignition operation by the control unit 100. As shown, during the spark ignition operation, fuel is injected by the fuel injection valve 3 in the intake stroke, and it (mixture gas) is then ignited with the ignition plug 4 in the compression stroke.

Figure 24:
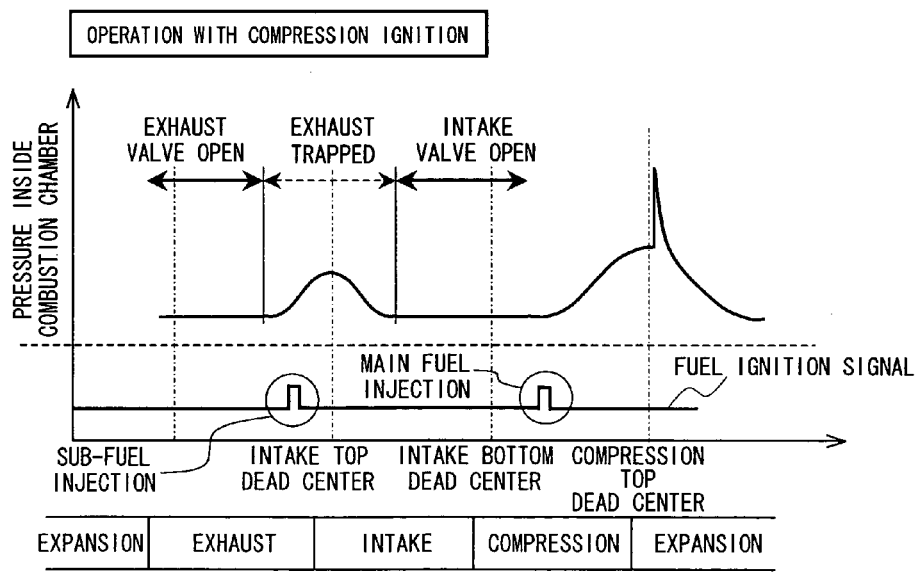
FIG. 24 shows a change in the pressure inside the combustion chamber during a cycle of compression ignition operation in the second embodiment of the invention.

Meanwhile, FIG. 24 shows the relationship between the pressure inside the combustion chamber 12 and fuel ignition signals and the like during the compression ignition operation by the control unit 100. While there are several methods for realizing the compression ignition operation, the profiles of the intake and exhaust valves 5 and 6 are changed such that exhaust gas is enclosed and trapped as shown in the present example (internal EGR). The fuel injection valve 3 performs a sub-injection of fuel into the thus trapped exhaust gas, which is then compressed and rendered into radicals. This is followed by the main-fuel injection by the fuel injection valve 3 in the compression stroke, whereby the fuel is self-ignited. Thus, the control unit 100 can control the temperature within the combustion chamber 12 by the internal EGR, and also control the ignition temperature through the sub-fuel injection and the main-fuel injection, so that the compression ignition timing can be appropriately controlled.

Figure 25A:
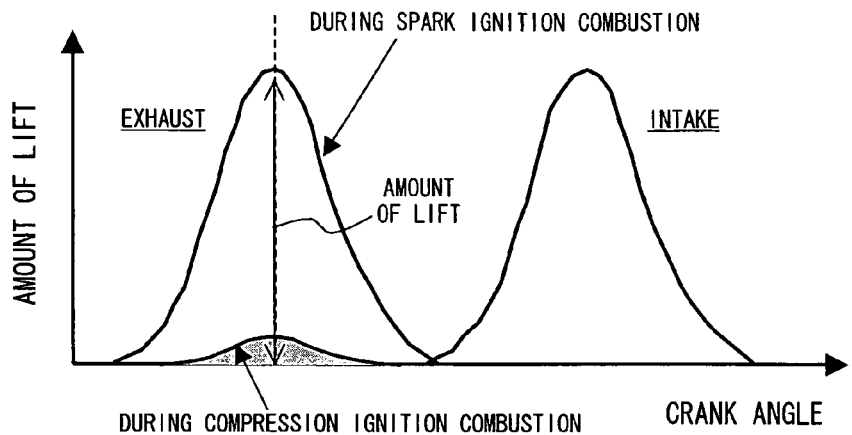
FIG. 25 shows examples of profiles of the intake valve and the exhaust valve during spark ignition combustion and compression ignition combustion in the second embodiment.
Figure 25B:
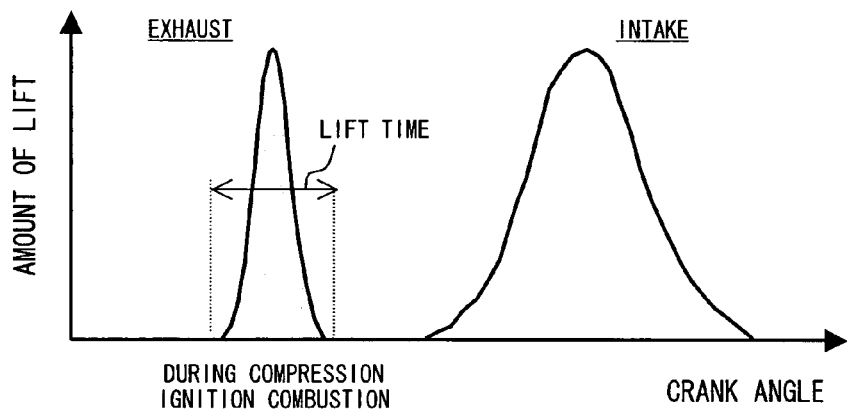
Figure 25C:
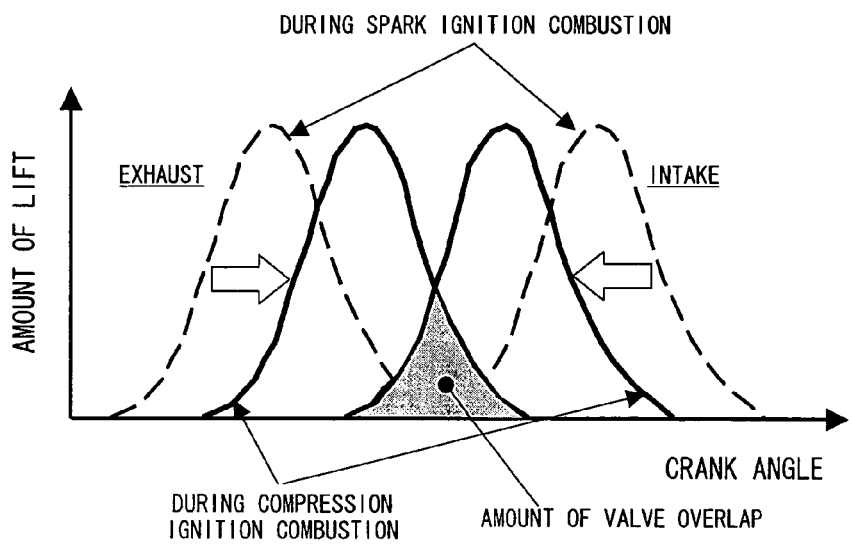

FIG. 25 shows the profiles of the intake and exhaust valves 5 and 6 for controlling the aforementioned internal EGR. FIG. 25(*a*) shows a case where the amount of lift of the exhaust valve 6 during compression ignition combustion is reduced as compared with that for spark ignition combustion, so as to trap the exhaust gas inside the combustion chamber 12 and increase the mass of internal EGR. FIG. 25(*b*) shows another case where the lift time (open/close duration) of the exhaust valve 6 during compression ignition combustion is shortened as compared with the lift time (open/close duration) of the intake valve 5, so as to trap the exhaust gas inside the combustion chamber 12 and increase the mass of internal EGR. Further, FIG. 25(*c*) shows another case where, during compression ignition combustion, the open/close timing of the intake valve 5 is advanced relative to the timing for spark ignition combustion, and the open/close timing of the exhaust valve 6 is retarded relative to the timing for spark ignition combustion. In this way, the exhaust gas is trapped in the combustion chamber 12 so as to increase the mass of internal EGR.

Figure 5:
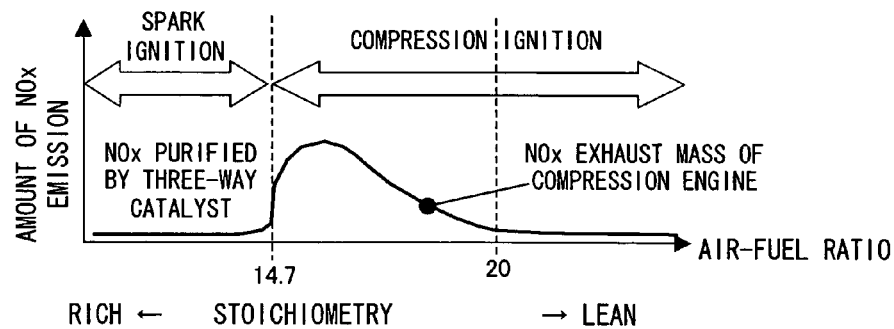
FIG. 5 shows the relationship between the air-fuel ratio and the mass of NOx emission in a compression ignition engine equipped with a three-way catalyst.

FIG. 5 shows the relationship between the air-fuel ratio and the mass of NOx emission downstream of the three-way catalyst 7 in the compression ignition engine 1, as mentioned above. At air-fuel ratios from rich toward stoichiometry, the three-way catalyst 7 has a high NOx purifying efficiency, and the NOx discharged from the combustion chamber 12 into the exhaust passage 13 is purified, resulting in less NOx emission to the outside. On the other hand, at air-fuel ratios from stoichiometry to approximately 20, the NOx purifying efficiency of the three-way catalyst 7 is low, and the mass of NOx emission from the combustion chamber 12 is large, resulting in a larger mass of NOx emission to the outside. However, the mass of NOx emission is lower than that of the direct-injection engine according to the first embodiment. Further, at lean air-fuel ratios of 20 or higher, the mass of NOx emission can be reduced to several dozens of ppm due to the effect of low-temperature fast burn that takes place at multiple points simultaneously.

Figure 26:
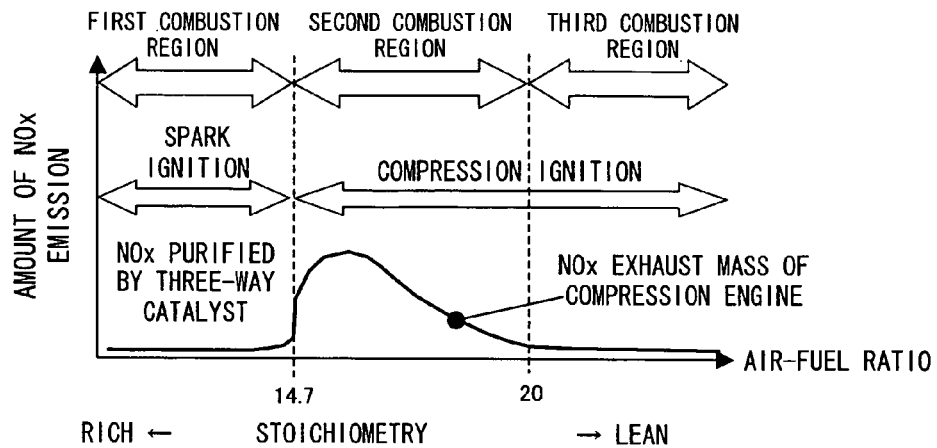
FIG. 26 shows the relationship between the combustion regions and the mass of NOx emission in the second embodiment.

The first combustion region, the second combustion region, and the third combustion region, which are divided depending on the air-fuel ratio of the mixture gas that feeds combustion, are defined as follows (FIG. 26). The first combustion region is a region where the three-way catalyst 7 has a high NOx purifying efficiency and where the mass of NOx downstream of the three-way catalyst 7 is dozens of ppm. Namely, this is an air-fuel ratio range from stoichiometry to rich where spark ignition combustion takes place. The second combustion region is an air-fuel ratio region between stoichiometry and 20 where the mass of NOx emission increases and where compression ignition combustion takes place. The third combustion region is a region where the mass of NOx emission is on the order of dozens of ppm. This is a lean air-fuel ratio region having air-fuel ratios of 20 or higher, where compression ignition combustion takes place.

In the following, it will be described how the mass of NOx emission and the torque variation are controlled upon switching of combustion regions from the first combustion region to the third combustion region via the second combustion region, or from the third combustion region to the first combustion region via the second combustion region according to the present embodiment.

The control unit 100 includes those means indicated by functional blocks in FIGS. 9 and 10, for example, as in the first embodiment. While the combustion region switching realization means 1003 of the first embodiment (FIG. 10) is configured as shown in FIG. 16, the combustion region switching realization means 1003 of the present embodiment is configured as shown in FIG. 27.

Figure 27:
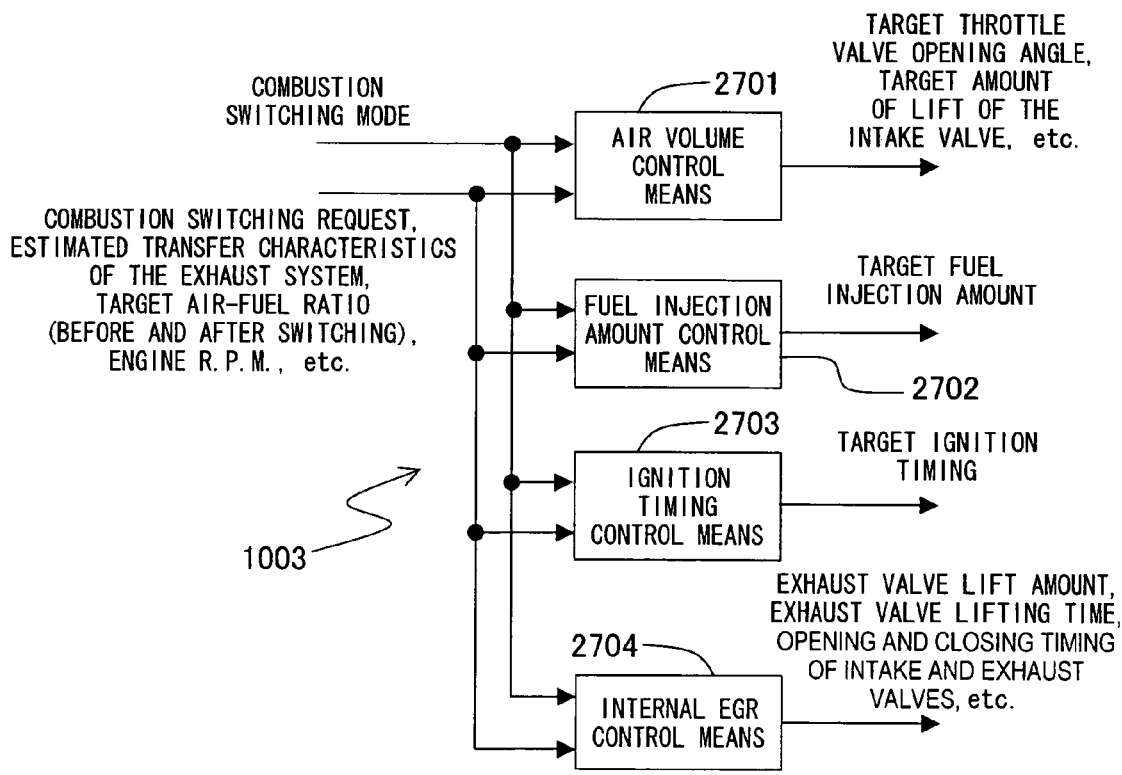
FIG. 27 shows a functional block diagram illustrating the details of another example of the means for realizing the switching of combustion regions shown in FIG. 10.

Specifically, the combustion region switching realization means 1003, as shown in FIG. 27, includes an air mass control means 2701, a fuel injection mass control means 2702, an ignition timing control means 2703, and an internal EGR control means 2704. The air mass control means 2701 calculates control quantities for intake air mass based on a request for switching combustion regions, the estimated transfer characteristics of the exhaust system, the air-fuel ratio before and after the switching of combustion regions, engine r.p.m., and the combustion region switching mode, for example. Examples of the control quantities for intake air mass include a target opening angle of the throttle valve, a target amount of lift of the intake valve, a target open/close time of the intake valve, and a target open/close timing of the intake valve.

The fuel injection mass control means 2702 calculates a target fuel injection mass based on a request for switching combustion regions, the estimated transfer characteristics of the exhaust system (response time constant of the exhaust air-fuel ratio), the air-fuel ratio before and after the switching of combustion regions, engine r.p.m., and the combustion region switching mode, for example.

The ignition timing control means 2703 calculates a target ignition timing based on a request for switching combustion regions, the estimated transfer characteristics of the exhaust system (response time constant of the exhaust air-fuel ratio), the air-fuel ratio before and after the switching of combustion regions, engine r.p.m., and the combustion region switching mode, for example.

Further, the internal EGR control means 2704 calculates internal EGR control quantities based on a request for switching combustion regions, the estimated transfer characteristics of the exhaust system, the air-fuel ratio before and after the switching of combustion regions, engine r.p.m., and the combustion region switching mode, for example. Examples of the internal EGR control quantities include the amount of lift of the exhaust valve 6, the open/close timing of the intake and exhaust valves 5 and 6 for adjusting the amount of overlap of the intake and exhaust valves 5 and 6 as shown in FIG. 25. It is noted, however, that each control means performs a control such that, as in the first embodiment, the delay in the change of air-fuel ratio at the entrance to the exhaust purifying device (three-way catalyst 7) in response to the change in the air-fuel ratio of the mixture gas that feeds combustion can be compensated based on the estimated transfer characteristics of the exhaust system, so as to suppress the increase in exhaust emissions.

By performing the above controls, it becomes possible to reduce the mass of NOx emission upon passing of the second combustion region when the combustion regions are switched between the first combustion region and the third combustion region, namely, between the spark ignition combustion region and the compression ignition combustion region. At the same time, the torque variation can be reduced below a predetermined value. Thus, the increase in exhaust emissions and the deterioration of operability can be effectively suppressed.

Figure 28:
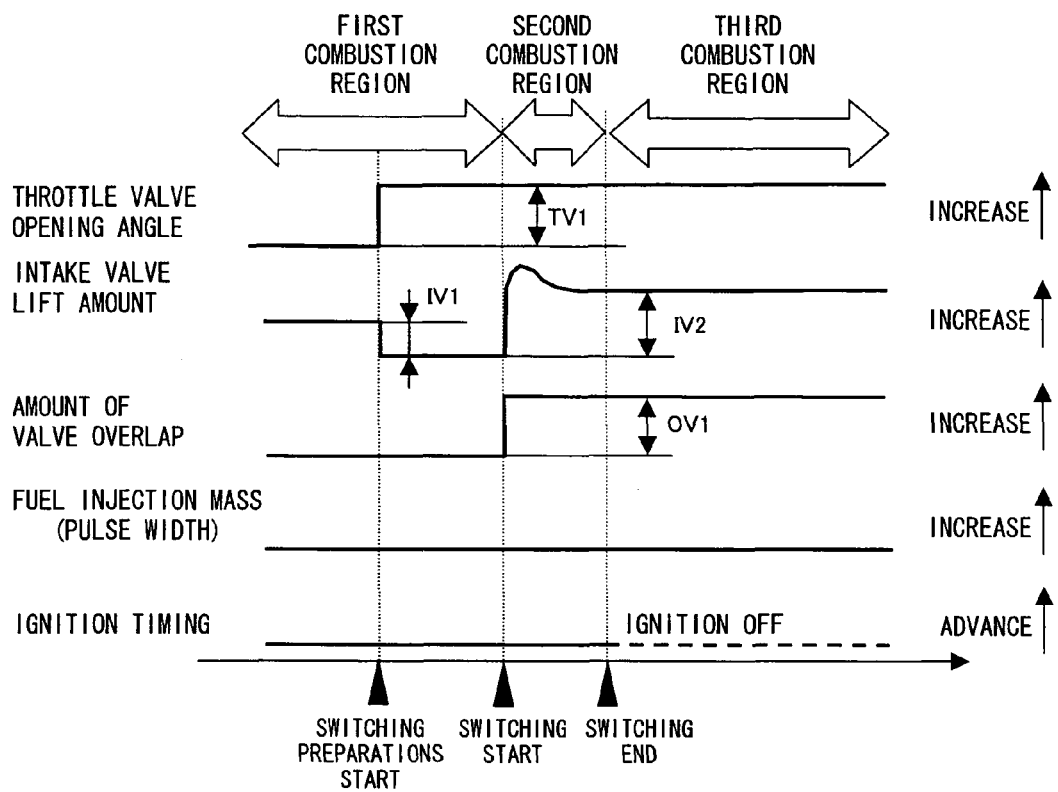
FIG. 28 shows a time chart for the explanation of a control operation during the switching of combustion regions in the second embodiment.

FIG. 28 shows an example of the switching control in a case where the mass of NOx emission and the torque variation would exceed allowed values if the intake air mass and the fuel injection mass are simultaneously manipulated upon switching of combustion regions from the first combustion region (spark ignition combustion region) to the third combustion region (compression ignition combustion region). This is a switching control in a steady state (where torque is constant). The mass of internal EGR is controlled through the amount of valve overlap.

FIG. 28 shows the individual target values of the opening angle of the throttle valve 2, the amount of lift of the intake valve 5, the amount of valve overlap, the fuel injection mass (fuel injection pulse width), and ignition timing, in time series (where the throttle valve opening angle, the amount of lift, and the fuel injection mass increase and the ignition timing advances in the upward direction in the chart).

The relationship among the intake air mass introduced into the combustion chamber 12, the opening angle TV1 of the throttle valve 2, and the amounts of lift IV1 and IV2 of the intake valve 5, and the relationship between the mass of internal EGR and the amount of valve overlap OV1 vary depending on the operating condition, such as engine r.p.m. and engine load. Therefore, it is necessary to determine the relationship among the intake air mass, the throttle valve opening angle TV1, and the amounts of lift IV1 and IV2 of the exhaust valve, and the relationship between the mass of internal EGR and the amount of valve overlap OV1 for each operating condition in advance by experiments or simulation, and to store them in the form of a map or a model.

Upon receiving a request for switching combustion regions from the currently operating first combustion region (spark ignition combustion region) to the third combustion region (compression ignition combustion region), the control unit 100 starts to control the engine so as to realize the switching of the combustion regions.

In the present example, it is determined that, upon switching of the combustion regions, the estimated mass of NOx emission and torque variation both exceed their allowed values, as in the first embodiment. Based on this determination, a combustion region switching mode is requested whereby the air-fuel ratio is switched by manipulating the intake valve 5 so as to change the intake air mass alone, so that the increase in exhaust emissions and the deterioration of operability can be suppressed.

Based on this combustion region switching mode, each control quantity is calculated. Initially, in preparation for the switching of combustion regions, the opening angle of the throttle valve 2 is adjusted and the intake passage 11 is filled with air. As this also causes the mass of intake air that is introduced into the combustion chamber to be changed, the amount of lift of the intake valve 5 is adjusted so as to maintain a constant mass of intake air into the combustion chamber 12. Thereafter, the switching of combustion regions is started, and the amount of lift of the intake valve 5 is increased so as to increase the mass of air in the combustion chamber 12 while the delay in the change of air-fuel ratio in the exhaust system is compensated. In order to perform compression ignition after the switching of combustion regions, the amount of valve overlap is increased and the mass of internal EGR is increased. The fuel injection mass becomes constant before and after the switching of combustion regions. With regard to ignition timing, an ignition signal is supplied in the first combustion region since spark ignition is conducted. However, once the combustion region is switched to the third combustion region, the ignition signal is turned off because self-ignition takes place.

Figure 29:
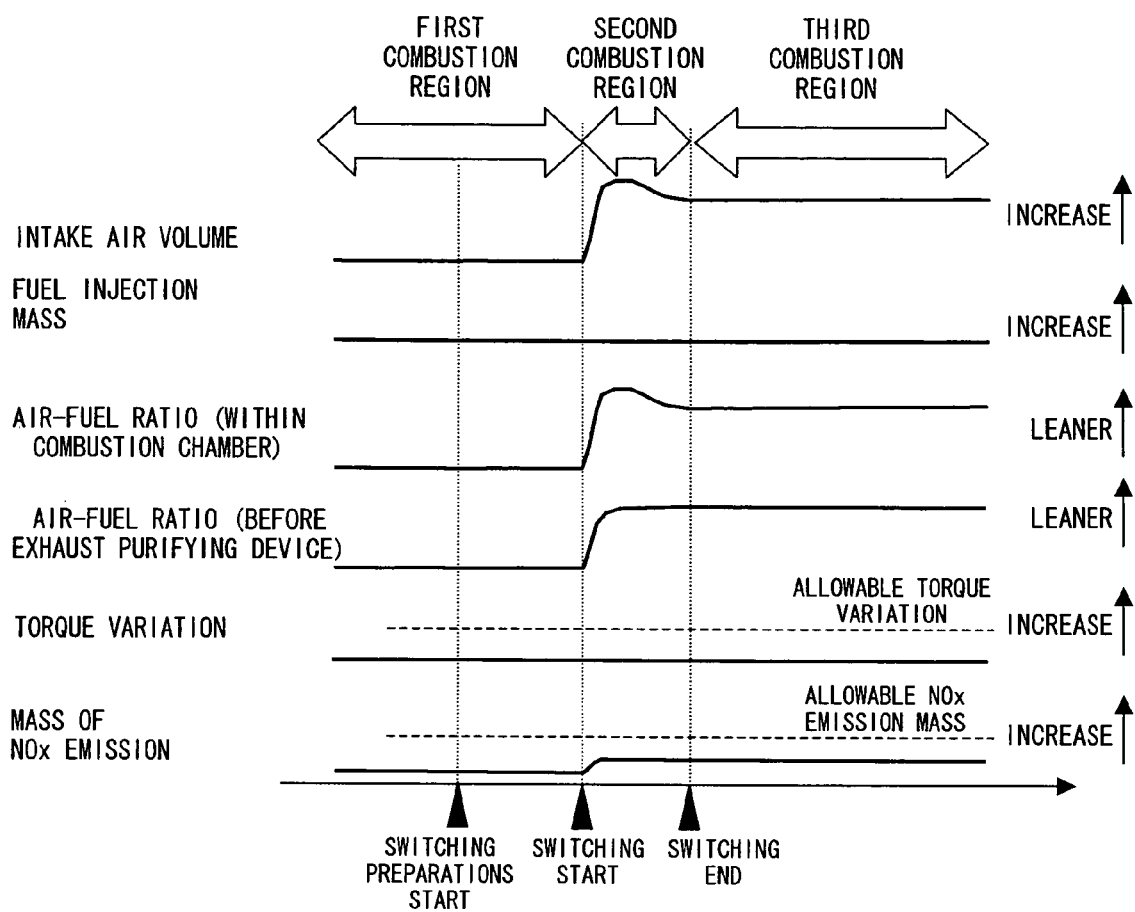
FIG. 29 shows a time chart for the explanation of an operation during the switching of combustion regions in the second embodiment.

FIG. 29 shows the air mass in the combustion chamber 12, fuel injection mass, the air-fuel ratio in the combustion chamber 12, the air-fuel ratio at the entrance to the exhaust purifying device 7, torque variation, and the mass of NOx emission at the exit of the exhaust purifying device 7 in time series, when the engine control is performed with a combustion region switching control apparatus 10A (where the air mass and the fuel injection mass increase, the air-fuel ratio becomes leaner, and the torque variation and the mass of NOx emission increase in the upward direction of the chart).

Thus, in the above control, preparations are made for the switching of combustion regions from the first combustion region (spark ignition combustion region) to the third combustion region (compression ignition combustion region). As a result, a constant intake air mass can be ensured regardless of the manipulation of the throttle valve and the intake valve. After the switching of combustion regions, the amount of lift of the intake valve 5 is increased so as to increase the intake air mass in the combustion chamber 12, while the amount of lift of the intake valve 5 is controlled such that the delay in the change of air-fuel ratio between the combustion chamber 12 and the entrance to the three-way catalyst 7 can be compensated. Thus, although the air-fuel ratio of the mixture gas in the combustion chamber 12 becomes excessively lean upon switching of combustion regions, the air-fuel ratio at the entrance to the three-way catalyst 7 changes from stoichiometry to lean in a short time and reaches a target air-fuel ratio. In this way, the mass of NOx emission upon switching of combustion regions can be reduced. In addition, because of the absence of manipulation of the fuel injection mass upon switching of combustion regions, torque variation can also be suppressed.

Because the estimated mass of NOx emission, the estimated torque variation, and the estimated transfer characteristics of the exhaust system are adjusted at the factory, they might have become less than appropriate over time. However, the increase in exhaust emissions and the deterioration of operability can be suppressed by learning based on the signals from the individual sensors, as in the first embodiment.

As described above, in accordance with the present embodiment, the intake air mass is adjusted by controlling the amount of lift of the intake valve, for example, upon switching of combustion regions so that the estimated mass of NOx emission and the estimated torque variation can be reduced below predetermined values. Thus, the increase in exhaust emissions and the deterioration of operability can be suppressed. Furthermore, the increase in exhaust emissions and the deterioration of operability due to changes over time or the like can be suppressed by learning and updating (correcting) the estimated values based on the signals from the individual sensors.

While an embodiment of the invention has been described above, the invention is not limited to such embodiment and various changes and modifications in design can be made without departing from the scope and spirit of the invention recited in the claims.

For example, while the foregoing embodiment includes the three-way catalyst 7 alone as an exhaust purifying device, the invention may also be applied to cases where a lean NOx catalyst is provided alone or in addition to the three-way catalyst 7. Furthermore, a combustion region switching mode may be adopted whereby two combustion region switching modes are sequentially performed upon switching of combustion regions. Namely, in such combustion region switching mode, after the intake air mass, fuel injection mass, and ignition timing are manipulated, the intake air mass alone is controlled. The engine may be provided with a bypass passage connecting the exhaust passage 13 and the intake passage 8, with a valve installed in the bypass passage, so that an external EGR control can be used in combination whereby the exhaust is pulled back to the intake side depending on the opening angle of the valve. In these cases, too, the same operation/effects as those described above can be obtained.

INDUSTRIAL APPLICABILITY

As will be understood from the foregoing description, in the engine controller of the invention, the mass of NOx emission downstream of the exhaust purifying device and the torque variation are estimated online upon switching of combustion regions from the first combustion region to the third combustion region and from the third combustion region to the first combustion region. Based on the estimated value of NOx emission and the estimated value of torque variation, the mass of intake air introduced into the combustion chamber is adjusted by changing the amount of lift of the intake valve, for example, so that the mass of NOx emission downstream of the exhaust purifying device and the torque variation upon passing of the second combustion region can be reduced below predetermined values. Thus, the increase in exhaust emissions and the deterioration of operability during switching of combustion regions can be effectively brought under control.

The invention claimed is:
1. An engine controller comprising an exhaust purifying device for purifying NOx at an air-fuel ratio richer than stoichiometry, wherein a first combustion region, a second combustion region, and a third combustion region are defined as combustion regions having air-fuel ratios of the mixture gas feeding combustion that sequentially vary from rich to lean, wherein combustion regions are switched from the first combustion region to the third combustion region via the second combustion region, or from the third combustion region to the first combustion region via the second combustion region, the engine controller further comprising:

> means for estimating the mass of NOx emission downstream of the exhaust purifying device online upon passing of the second combustion region;
> means for estimating torque variation online upon passing of the second combustion region; and
> combustion control means for reducing the mass of NOx emission downstream of the exhaust purifying device and the torque variation below predetermined values based on the estimated value of the mass of NOx emission and the estimated value of the torque variation when the second combustion region is passed.

2. The controller according to claim 1, wherein the means for estimating the mass of NOx emission comprises:

> means for estimating the mass of NOx emission at the entrance to the exhaust purifying device when the second combustion region is passed based on the air-fuel ratio of the mixture gas feeding combustion, engine r.p.m., engine torque, and the mass of EGR introduced into the combustion chamber or the mass of EGR remaining in the combustion chamber; and
> a catalyst model for estimating the mass of NOx emission at the exit of the exhaust purifying device based on the air-fuel ratio at the entrance to the exhaust purifying device, the temperature of the exhaust purifying device, and the estimated mass of NOx emission at the entrance to the exhaust purifying device.

3. The controller according to claim 1, wherein the means for estimating the mass of NOx emission estimates the mass of NOx emission downstream of the exhaust purifying device upon switching of combustion regions by accumulating the mass of NOx emission calculated at intervals of T2 for a period T1 that is required for the switching of combustion regions, where T2 is sufficiently shorter than T1.

4. The controller according to claim 1, further comprising an air-fuel ratio sensor for detecting the concentration of NOx in the exhaust gas upstream or downstream of the exhaust purifying device, wherein the means for estimating the mass of NOx emission adjusts parameters for the estimation of the mass of NOx emission based on the output of the air-fuel ratio sensor.

5. The controller according to claim 1, wherein the means for estimating the torque variation estimates the torque variation based on the mass of fuel supply and the engine r.p.m. at the time of the passing of the second combustion region.

6. The controller according to claim 1, further comprising a torque sensor for detecting the engine torque, wherein the means for estimating the torque variation adjusts parameters for the estimation of torque variation based on the output of the torque sensor.

7. The controller according to claim 1, wherein the first combustion region is defined as an air-fuel ratio region richer than stoichiometry.

8. An automobile in which an engine is mounted, to which the controller according to claim 1 is applied.

9. The controller according to claim 1, wherein the means for estimating the torque variation causes the intake air mass to be changed by changing the opening angle of the throttle valve within a predetermined time upon switching of combustion regions, and then estimates the torque variation based on an amount of torque variation due to a correction of the mass of fuel supply that is made so as to compensate the time delay in the change of the intake air mass in response to the change in the throttle valve.

10. The controller according to claim 9, wherein the means for estimating the torque variation causes the ignition timing to be retarded upon switching of combustion regions and then estimates the torque variation based on a value obtained by subtracting an amount of torque variation due to the retarding of the ignition timing from an amount of torque variation due to the correction of the mass of fuel supply.

11. The controller according to claim 1, further comprising means capable of varying the intake air mass in a shorter time than the time delay of the change in the intake air mass in response to the change in the opening angle of the throttle valve, wherein the combustion control means causes the intake air mass to be changed using the means for varying the mass of air if the torque variation due to the correction of the fuel supply mass exceeds a predetermined value.

12. The controller according to claim 11, wherein the means for varying the mass of air comprises an intake valve of which at least one of the open/close time, the open/close timing, and the amount of lift is variable.

13. The controller according to claim 11, wherein the combustion control means corrects the fuel supply mass such that the air-fuel ratio of the mixture gas feeding combustion is changed within a predetermined time if the response delay in the air-fuel ratio of the mixture gas feeding combustion in response to a change in a target air-fuel ratio during the passing of the second combustion region exceeds a predetermined value.

14. The controller according to claim 13, wherein, if a torque variation is caused by the correction of the fuel supply mass during the passing of the second combustion region, the combustion control means suppresses the torque variation by retarding the ignition timing.

15. The controller according to claim 11, wherein the combustion control means, upon switching of combustion regions, adjusts the opening angle of the throttle valve so as to change the response characteristics of the air mass between the throttle valve and the means for varying the mass of air, and it simultaneously adjusts the operation of the means for varying the mass of air so as to make the intake air mass equal to that prior to the adjustment of the throttle valve opening angle, the combustion control means thereafter controlling the operation of the means for varying the mass of air so as to change the intake air mass.

16. The controller according to claim 1, further comprising:

> an exhaust system model for estimating the air-fuel ratio at the entrance to the exhaust purifying device based on the air-fuel ratio of the mixture gas, engine r.p.m., and engine torque during the passing of the second combustion region; and
> an exhaust system inverse model for estimating the air-fuel ratio of the mixture gas based on the air-fuel ratio at the entrance to the exhaust purifying device that is estimated by the exhaust system model,
> wherein the combustion control means changes the air-fuel ratio of the mixture gas based on the exhaust system inverse model if the time it takes to pass the second combustion region exceeds a predetermined value.

17. The controller according to claim 16, wherein parameters of the exhaust system inverse model are adjusted based on the output of the air-fuel ratio sensor.

18. The controller according to claim 1, wherein the exhaust purifying device comprises a lean NOx catalyst.

19. The controller according to claim 18, wherein the second combustion region is defined as an air-fuel ratio region between stoichiometry and an air-fuel ratio at which the NOx storage efficiency of the lean NOx catalyst exceeds a predetermined value.

20. The controller according to claim 18, wherein the third combustion region is defined as a region in which the air-fuel ratio is leaner than the air-fuel ratio at which the NOx storage efficiency of the lean NOx catalyst exceeds a predetermined value.

21. The controller according to claim 1, wherein the engine comprises a compression ignition engine and the exhaust purifying device comprises a three-way catalyst.

22. The controller according to claim 21, wherein the second combustion region is defined as an air-fuel ratio region between stoichiometry and an air-fuel ratio at which the NOx concentration at the exit of the combustion chamber drops below a predetermined value.

23. The controller according to claim 21, wherein the third combustion region is defined as a region in which the air-fuel ratio is leaner than the air-fuel ratio at which the NOx concentration at the exit of the combustion chamber is below a predetermined value.

* * * * *